United States Patent
Kim et al.

(10) Patent No.: US 12,166,581 B2
(45) Date of Patent: Dec. 10, 2024

(54) ERASURE STYLE LDPC RATE MATCHING FOR TB OVER MULTIPLE SLOTS

(71) Applicant: QUALCOMM Incorporated, San Diego, CA (US)

(72) Inventors: Sanghoon Kim, San Jose, CA (US); Alexei Yurievitch Gorokhov, San Diego, CA (US); Hari Sankar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 369 days.

(21) Appl. No.: 17/664,630

(22) Filed: May 23, 2022

(65) Prior Publication Data

US 2022/0385398 A1    Dec. 1, 2022

Related U.S. Application Data

(60) Provisional application No. 63/192,546, filed on May 24, 2021.

(51) Int. Cl.
| | |
|---|---|
| *H04L 1/00* | (2006.01) |
| *H04W 72/0446* | (2023.01) |
| *H04W 72/21* | (2023.01) |

(52) U.S. Cl.
CPC ....... *H04L 1/0067* (2013.01); *H04W 72/0446* (2013.01); *H04W 72/21* (2023.01)

(58) Field of Classification Search
None
See application file for complete search history.

(56) References Cited

U.S. PATENT DOCUMENTS

| | | |
|---|---|---|
| 7,764,743 B2 | 7/2010 | Farag |
| 8,144,615 B2 | 3/2012 | Hong |

(Continued)

FOREIGN PATENT DOCUMENTS

| | | |
|---|---|---|
| CA | 2795634 C | 7/2016 |

OTHER PUBLICATIONS

Huawei, et al., "Discussion on TB Processing Over Multi-Slot PUSCH", 3GPP TSG RAN WG1 #105-e, R1-2104242, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, 10 Pages, XP052010696, Title, p. 1, Sections 2.1 and 2.2, 2.2.2-2.2.6.

(Continued)

*Primary Examiner* — Otis L Thompson, Jr.
(74) *Attorney, Agent, or Firm* — Procopio, Cory, Hargreaves & Savitch LLP

(57) ABSTRACT

Methods, apparatuses, and computer-readable storage medium for rate matching for TBoMS are provided. An example method includes calculating a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching. The example method may include allocating one or more bits of the plurality of rate matching output bits for a modulation process. The example method may include refraining allocating at least one bit of the plurality of rate matching output bits for the modulation process, the at least one bit corresponding to UCI multiplexing.

30 Claims, 13 Drawing Sheets

(56) References Cited

U.S. PATENT DOCUMENTS

| | | | |
|---|---|---|---|
| 9,191,176 B2 | 11/2015 | Jang et al. | |
| 10,530,528 B2 * | 1/2020 | Park et al. | |
| 2020/0235891 A1 * | 7/2020 | Lei | H04L 5/001 |
| 2022/0045789 A1 * | 2/2022 | Karmoose | H04W 72/1268 |
| 2022/0321269 A1 * | 10/2022 | Nhan | H03M 13/356 |
| 2022/0346091 A1 * | 10/2022 | Karmoose | H04L 1/0072 |

OTHER PUBLICATIONS

International Search Report and Written Opinion—PCT/US2022/030745—ISA/EPO—Sep. 12, 2022.
Qualcomm Incorporated: "TB Processing Over Multi-Slot PUSCH", 3GPP TSG-RAN WG1 Meeting #104bis, R1-2104686, 3rd Generation Partnership Project, Mobile Competence Centre, 650, Route Des Lucioles, F-06921 Sophia-Antipolis Cedex, France, vol. RAN WG1, No. e-Meeting, May 10, 2021-May 27, 2021, May 12, 2021, XP052010937, Title, p. 1, Sections 2.3-2.4, p. 5-7, figure 7.
Qualcomm Incorporated: "TB Processing Over Multi-Slot PUSCH", 3GPP TSG-RAN WG1 Meeting #106-e, R1-2107360, 3rd Generation Partnership Project, Mobile Competence Centre, 650, Route Des Lucioles, F-06921 Sophia-Antipolis Cedex, France, vol. RAN WG1, No. e-Meeting, Aug. 16, 2021-Aug. 27, 2021, 9 Pages, Aug. 6, 2021, XP052038305, Sections 2.4-2.5, p. 5-7, figure 4.

* cited by examiner

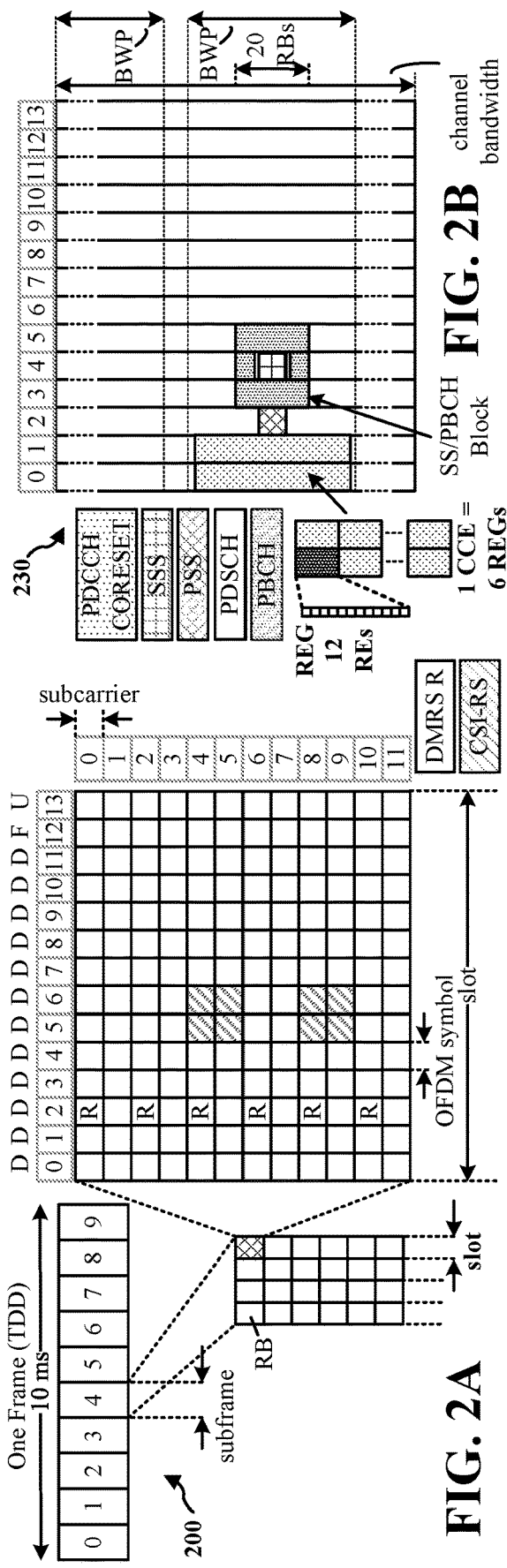
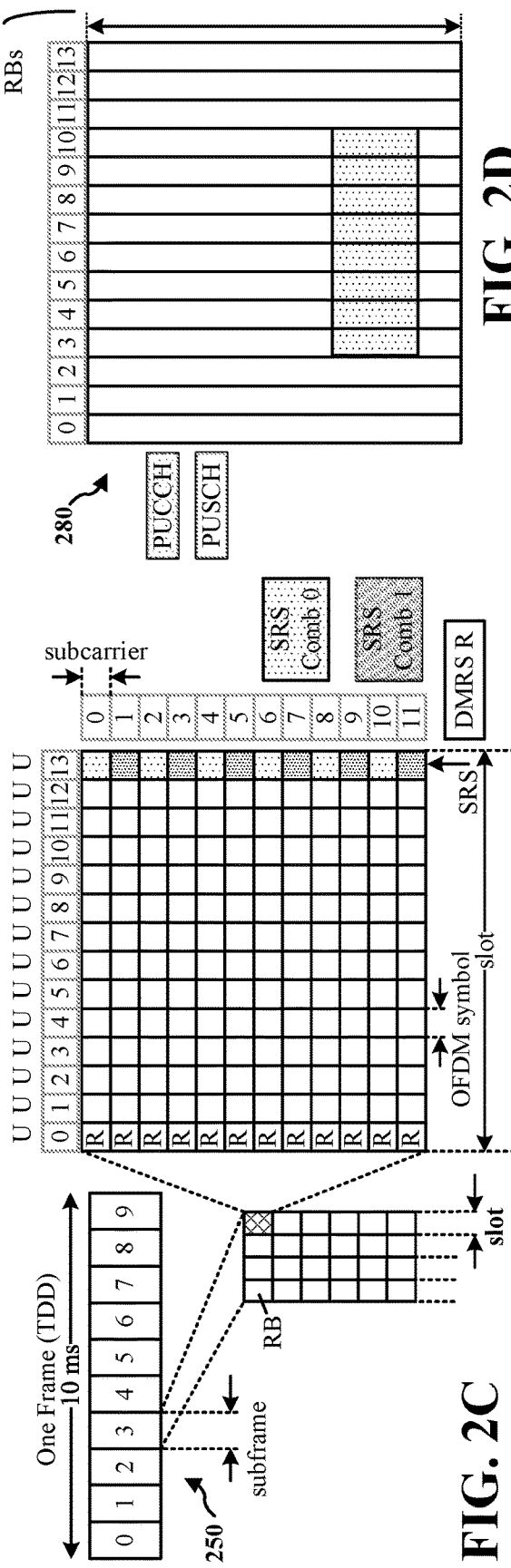
FIG. 2A FIG. 2B FIG. 2C FIG. 2D

ERASURE STYLE LDPC RATE MATCHING FOR TB OVER MULTIPLE SLOTS

CROSS REFERENCE TO RELATED APPLICATION(S)

This application claims the benefit of and priority to U.S. Provisional Application Ser. No. 63/192,546, entitled "ERASURE STYLE LDPC RATE MATCHING FOR TB OVER MULTIPLE SLOTS" and filed on May 24, 2021, which is expressly incorporated by reference herein in its entirety.

TECHNICAL FIELD

The present disclosure relates generally to communication systems, and more particularly, to wireless communication systems utilizing transport block (TB) over multiple slots (TBoMS).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus at a user equipment (UE) are provided. The apparatus may include a memory and at least one processor coupled to the memory. The memory and the at least one processor coupled to the memory may be configured to calculate a slot length for each uplink (UL) slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching. The memory and the at least one processor coupled to the memory may be further configured to allocate one or more bits of the plurality of rate matching output bits for a modulation process. The memory and the at least one processor coupled to the memory may be further configured to skip (e.g., refrain from) allocating at least one bit of the plurality of rate matching output bits for the modulation process, the at least one bit corresponding to uplink control information (UCI) multiplexing.

In an aspect of the disclosure, a method, a computer-readable medium, and an apparatus at a base station are provided. The apparatus may include a memory and at least one processor coupled to the memory. The memory and the at least one processor coupled to the memory may be configured to transmit, for a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching. The memory and the at least one processor coupled to the memory may be further configured to receive an UL transmission based on an allocation of one or more bits of the plurality of rate matching output bits and a refrained allocation of at least one bit of the plurality of rate matching output bits, the at least one bit associated with uplink control information (UCI) multiplexing.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 2A is a diagram illustrating an example of a first frame, in accordance with various aspects of the present disclosure.

FIG. 2B is a diagram illustrating an example of DL channels within a subframe, in accordance with various aspects of the present disclosure.

FIG. 2C is a diagram illustrating an example of a second frame, in accordance with various aspects of the present disclosure.

FIG. 2D is a diagram illustrating an example of UL channels within a subframe, in accordance with various aspects of the present disclosure.

DETAILED DESCRIPTION

Figure 1:
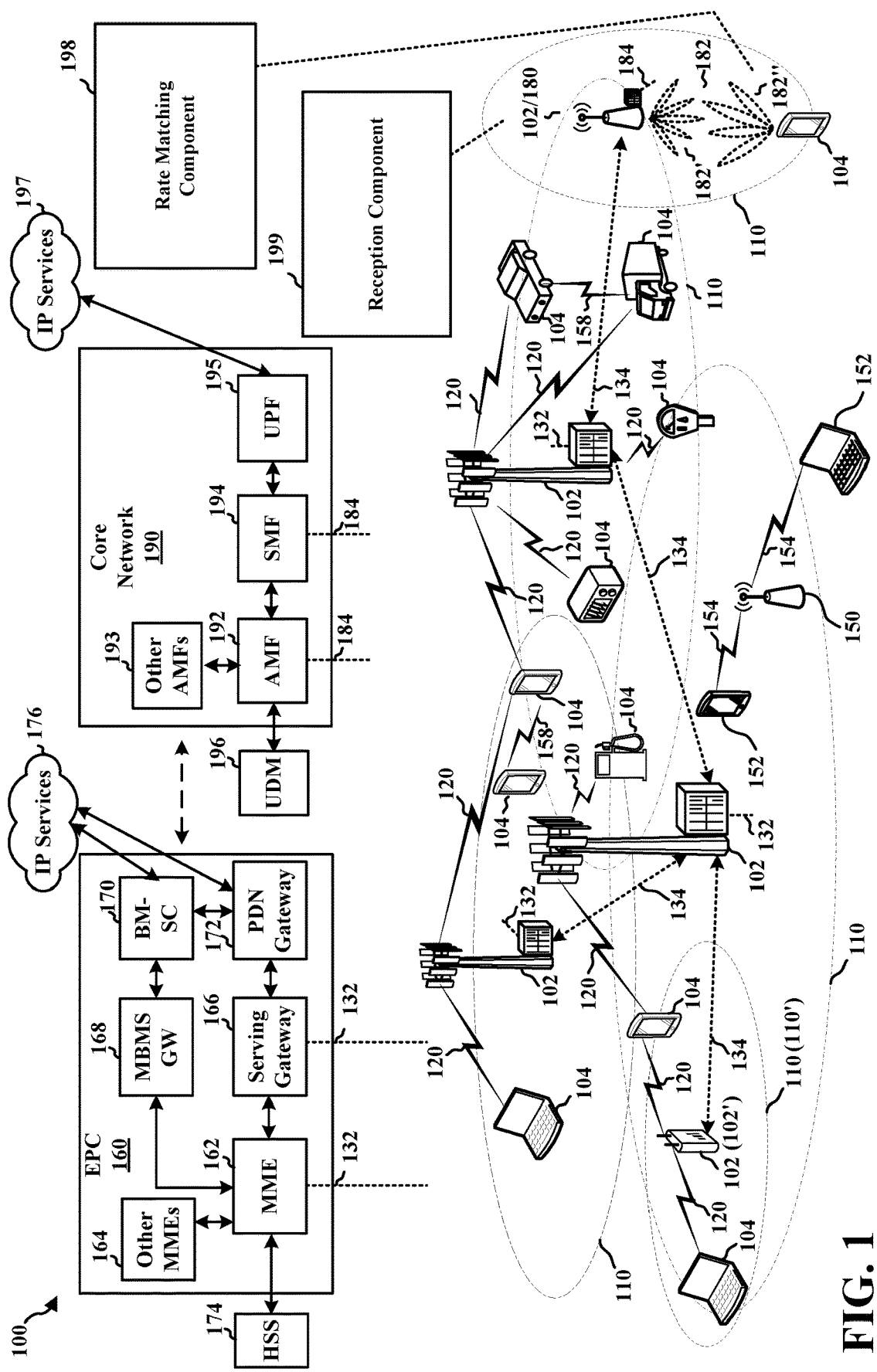
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network. In some scenarios, the term UE may also apply to one or more companion devices such as in a device constellation arrangement. One or more of these devices may collectively access the network and/or individually access the network. A network node or network entity can be implemented as a base station (i.e., an aggregated base station), as a disaggregated base station, an integrated access and backhaul (IAB) node, a relay node, a sidelink node, etc. A network node or network entity can be implemented as a base station (i.e., an aggregated base station), or alternatively, as a central unit (CU), a distributed unit (DU), a radio unit (RU), a Near-Real Time (Near-RT) RAN Intelligent Controller (RIC), or a Non-Real Time (Non-RT) RIC in a disaggregated base station architecture. In some aspects, a network node may be referred to as a network entity, or vice versa.

Referring again to FIG. 1, in some aspects, the UE 104 may include a rate matching component 198. In some aspects, the rate matching component 198 may be configured to calculate a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching. In some aspects, the rate matching component 198 may be further configured to allocate one or more bits of the plurality of rate matching output bits for a modulation process. In some aspects, the rate matching component 198 may be further configured to skip (e.g., refrain from) allocating at least one bit of the plurality of rate matching output bits for the modulation process, the at least one bit corresponding to UCI multiplexing. The slot length may be calculated based on the number of bits to be encoded in the slot. In some aspects, the slot length may be further calculated based on the number of REs that may be skipped in the slot due to UCI multiplexing.

In certain aspects, the base station 180 may include a reception component 199. In some aspects, the reception component 199 may be configured to transmit, to a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching. In some aspects, the reception component 199 may be further configured to receive, from the UE, an UL transmission based on an allocation of one or more bits of the plurality of rate matching output bits and a skipped allocation of at least one bit of the plurality of rate matching output bits based on UCI multiplexing associated with the at least one bit.

Although the following description may be focused on 5G NR, the concepts described herein may be applicable to other similar areas, such as LTE, LTE-A, CDMA, GSM, and other wireless technologies.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

TABLE 1

| μ | SCS $\Delta f = 2^\mu \cdot 15 [kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (e.g., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
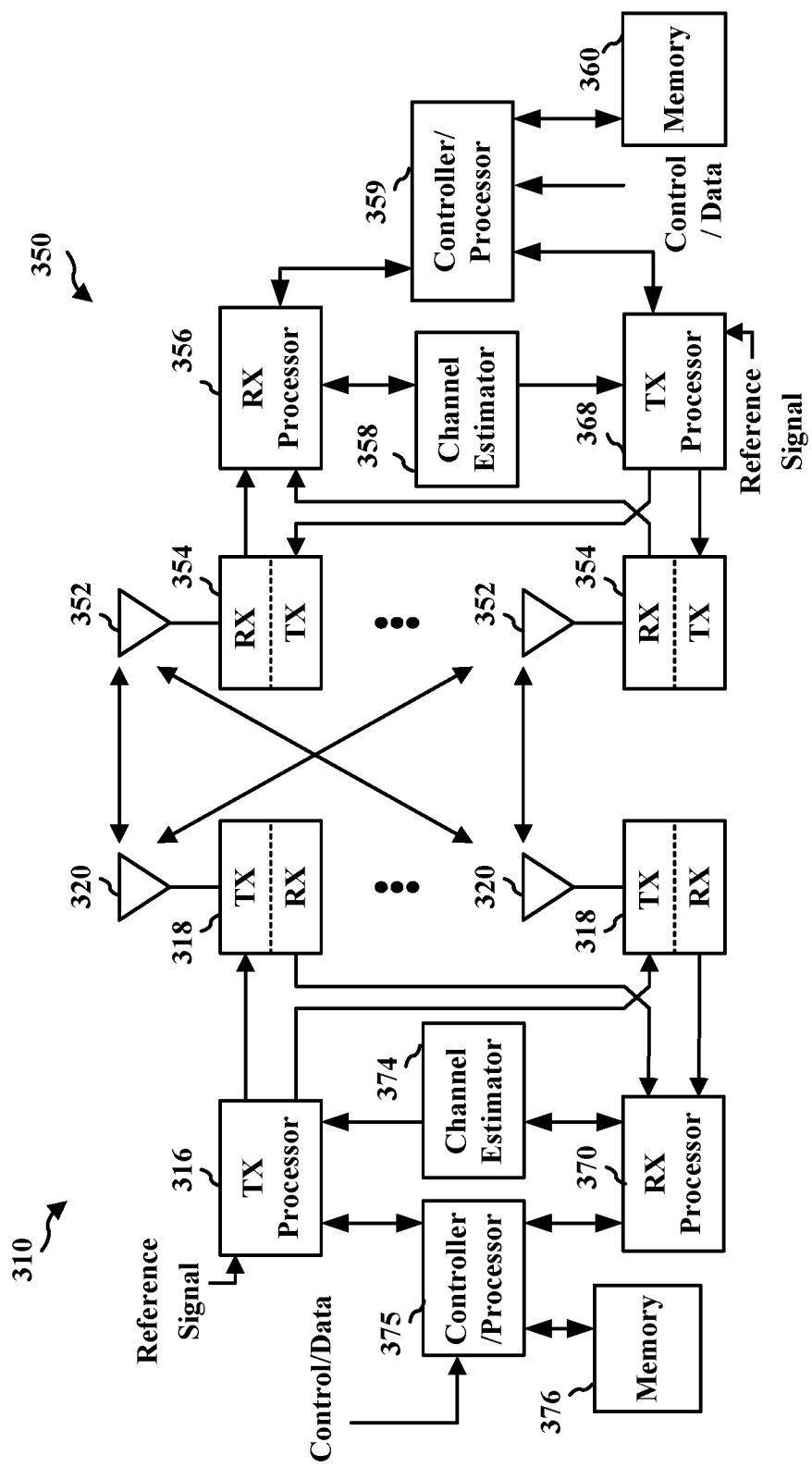
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC

160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via a separate transmitter (TX) 354. Each transmitter (TX) 354 may modulate an RF carrier with a respective spatial stream for transmission.

The UL transmission is processed at the base station 310 in a manner similar to that described in connection with the receiver function at the UE 350. Each receiver (RX) 318 receives a signal through its respective antenna 320. Each receiver (RX) 318 recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with rate matching component 198 of FIG. 1.

At least one of the TX processor 316, the RX processor 370, and the controller/processor 375 may be configured to perform aspects in connection with reception component 199 of FIG. 1.

In aspects of wireless communication, a TB may correspond to a payload that includes data given by an upper layer (such as the medium access control (MAC) layer) to a physical layer to be jointly encoded. Upper layer data may be multiplexed on the TBs and transmitted by the physical layer in a radio transmission link. A TB may be divided into one or more coded blocks (CBs) by the physical layer. Data and control streams from/to the MAC layer may be encoded/decoded to offer transport and control services over the radio transmission link. A channel coding scheme may be a combination of error detection, error correcting, rate matching, interleaving, and transport channel or control information mapping onto/splitting from physical channels.

Each CB may be associated with one cyclic redundancy check (CRC). Each CB may be passed to an encoder (such as an encoder for turbo coding). The encoder may use turbo coding in connection with CRC and polar code (for error correction) or low density parity check code (LDPC) to encode data. For example, in some aspects, polar code may be used for control information encoding (such as for a PUCCH) and LDPC may be used for user data encoding (such as for a PUSCH). Polar code may also split channels. Turbo coding may provide a ⅓ rate encoding (3 output bits may be generated based on one input bit, the first output bit may be the systematic bit that corresponds with the one input bit and the other two out bits may be parity bits that are interleaved versions of the input bits). For polar code, if K information bits are being sent in a block of N bits, polar code may be used to polarize the channel into reliable and unreliable bit-channels and the information bits may be transmitted on the most reliable K bit-channels and the rest of the channels that are unreliable may be set to 0.

In some wireless communication systems, each PUSCH slot may be associated with one TB. In some wireless communication systems, one TB may be used across different PUSCH slots. One TB used across different PUSCH slots may be otherwise referred to as TBoMS. A rate-matching process may extract the exact set of bits to be transmitted within a transmission time interval (TTI) (such as one or more slots). For example, rate matching may match the number of bits in a TB to the number of bits that can be transmitted in a given allocation. Rate matching may include sub-block interleaving, bit collection, and pruning. Rate matching may be performed over CB s and may be performed after the CBs are turbo encoded. Rate matching output size may be determined before starting the first slot PUSCH of the TBoMS. In some wireless communication systems, rate matching may use available tones for a PUSCH. A tone may refer to a part of a TB/CB where a bit may be stored. The available tones for a PUSCH may be tones that are not used for uplink control information (UCI) multiplexing. As one non-limiting example, the UCI may be a PUCCH that includes acknowledgment/non-acknowledgment (A/N) bits. For TBoMS, a UCI multiplexing decision may be made after TBoMS is started (after the first slot of TBoMS). Therefore, the UCI multiplexing decision made after TBoMS may change the number of available tones for the PUSCH. Such a change may make rate matching for TBoMS difficult or inefficient. A dynamic update of rate matching might not be supported by some wireless communication systems. A UE may not delay UCI multiplexing, such as a PUCCH for A/N, for a long period of time. Some aspects provided herein may provide rate matching for TBoMS. In some aspects, rate matching may be configured before the start of TBoMS. When there is dynamic UCI multiplexing, the rate matching output size may not be changed and rate matching with TBoMS may be efficient even without dynamic update of rate matching.

Figure 4:
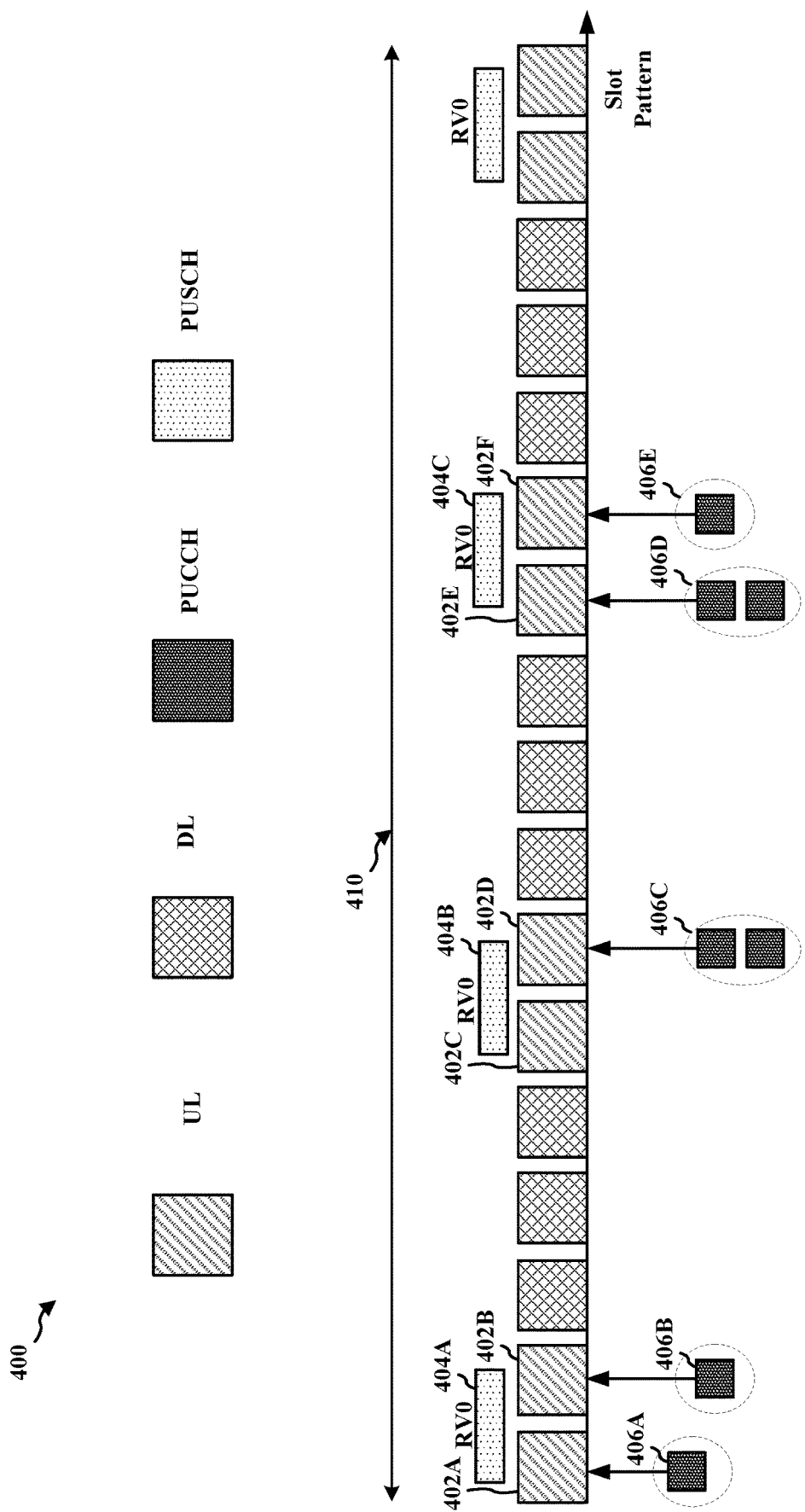
FIG. 4 is a diagram illustrating example TBoMS.

FIG. 4 is a diagram 400 illustrating an example TBoMS. As illustrated in FIG. 4, a timeframe 410 may include one or more slots. The one or more slots may be associated with a single TB for TBoMS. The one or more slots may include DL slots and UL slots. Some of the UL slots may include a PUSCH and may also be used for UCI multiplexing. For example, the UL slot 402A may be used for PUSCH 404A and UCI multiplexing for PUCCH 406A. The UL slot 402B may be used for PUSCH 404A and UCI multiplexing for PUCCH 406B. The PUSCH 404A may be associated with a redundancy version (RV) 0. The UL slot 402C may be used for PUSCH 404B. The UL slot 402D may be used for PUSCH 404B and UCI multiplexing for PUCCH 406C. The UL slot 402E may be used for PUSCH 404C and UCI multiplexing for PUCCH 406D. The UL slot 402F may be used for PUSCH 404C and UCI multiplexing for PUCCH 406E. The UL slot 402A, the UL slot 402B, the UL slot 402D, the UL slot 402E, and the UL slot 402F may each include tones that may be planned to be available for a PUSCH at the beginning of the timeframe 410 but may end up being used for UCI multiplexing for a PUCCH. Such a conflict may be resolved based on aspects provided herein.

Figure 5:
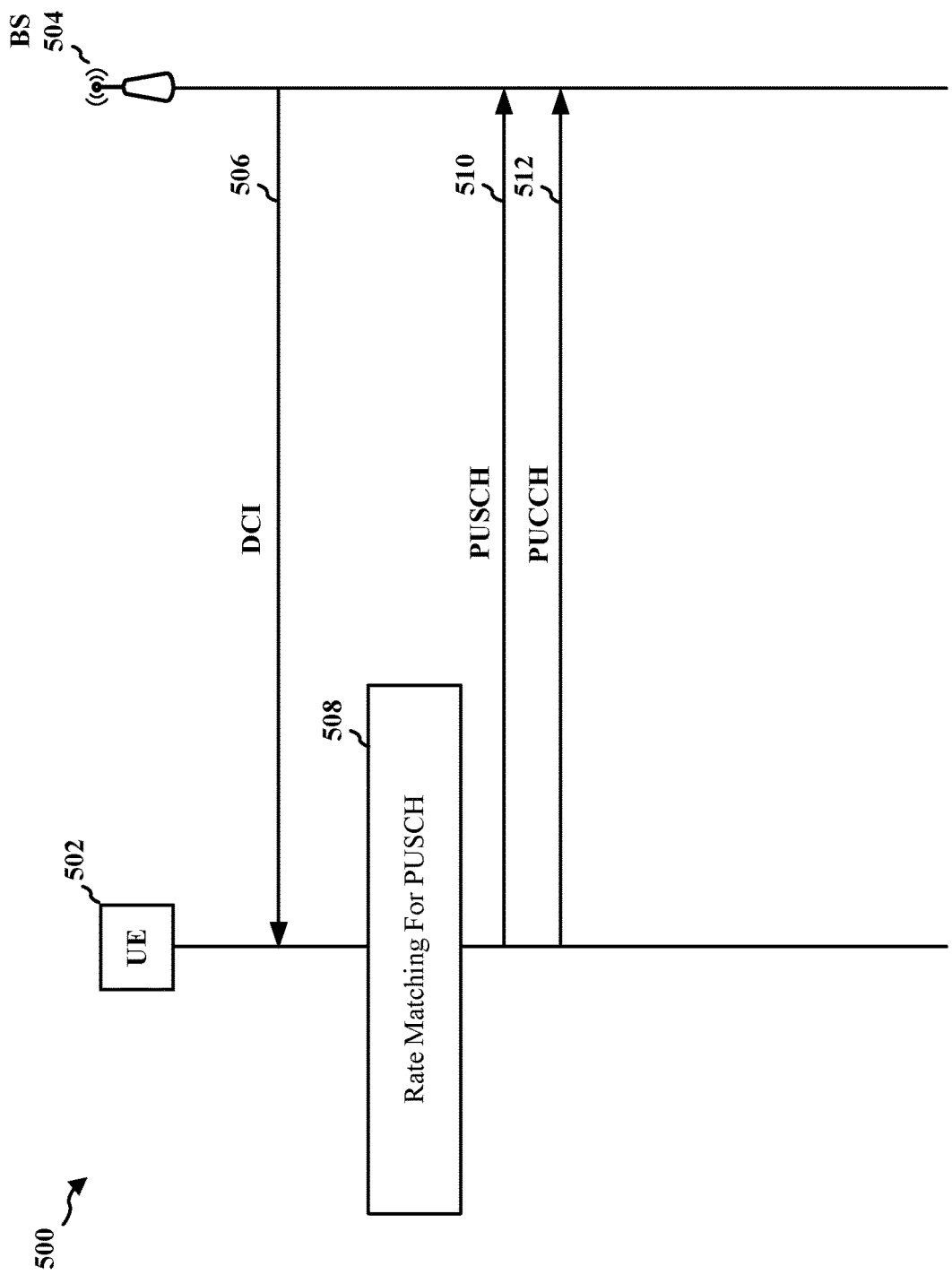
FIG. 5 illustrates an example communication flow between a UE and a base station.

FIG. 5 illustrates an example communication flow 500 between a UE 502 and a base station 504. In some aspects, the base station 504 may be a network entity. The network entity may be a network node. The base station 504 may be implemented as an aggregated base station, as a disaggregated base station, an integrated access and backhaul (IAB) node, a relay node, a sidelink node, or the like. A network entity can be implemented in an aggregated or monolithic base station architecture, or alternatively, in a disaggregated base station architecture, and may include one or more of a CU, a DU, a RU, a Near-Real Time (Near-RT) RAN Intelligent Controller (RIC), or a Non-Real Time (Non-RT) RIC. The base station 504 may transmit DCI 506 to the UE 502 which may include PUSCH configurations. The DCI 506 may schedule one or more TBs. The UE 502 may encode a PUSCH/PUCCH for transmission to the base station 504 which may include rate matching for a PUSCH at 508 (and may also include calculating rate matching output size/slot length, allocating one or more bits, and refrain from allocating one or more other bits). After encoding, the UE 502 may transmit PUSCH 510 and PUCCH 512 to the base station 504. The PUSCH 510 may be encoded based on LDPC encoding and the rate matching at 508 may be rate matching for LDPC code.

The rate matching for LDPC code may be defined per CB and may include bit selection and bit interleaving. The input bit sequence to rate matching may be denoted as $d_0, d_1, d_2, \ldots, d_{N-1}$. The output bit sequence after rate matching may be denoted as $f_0, f_1, f_2, \ldots, f_{E-1}$.

The bit sequence after encoding $d_0, d_1, d_2, \ldots, d_{N-1}$ may be written into a circular buffer of length $N_{cb}$ for the r-th coded block. N may be defined based on an LDCP base graph. For the r-th code block, let $N_{cb}=N$ if $I_{LBRM}=0$ and $N_{cb}=\min(N, N_{ref})$ (minimum of N and $N_{ref}$), otherwise, where $$N_{ref} = \left\lfloor \frac{TBS_{LBRM}}{C \cdot R_{LBRM}} \right\rfloor.$$

Transport block size (TBS) limited buffer rate-matching (LBRM) may be defined. The parameter $R_{LBRM}$ may be ⅔. The parameter c may be the number of CBs of the transport block. $N_{ref}$ may be a reference and may be equal to TBS LBRM divided by the parameter $R_{LBRM}$ and the number of CBs of the transport block.

The rate matching output sequence length for the r-th CB may be denoted by $E_r$, and the value of $E_r$ may be determined as follows:

Set j = 0
for r = 0 to C − 1

```
    if the r -th coded block is not scheduled for transmission as indicated
by
        code block group transmission information (CBGTI)
        E_r = 0;
    else
        if j ≤ C' −mod(G/(N_L · Q_m), C') − 1
```

$$E_r = N_L \cdot Q_m \cdot \left\lfloor \frac{G}{N_L \cdot Q_m \cdot C'} \right\rfloor;$$

```
        else
```

$$E_r = N_L \cdot Q_m \cdot \left\lceil \frac{G}{N_L \cdot Q_m \cdot C'} \right\rceil;$$

```
        end if
        j = j +1;
    end if
end for
```

The parameter $N_L$ may be the number of transmission layers on which the transport block is mapped. The parameter $Q_m$ is the modulation order. In some wireless communication systems, the parameter G may be the total number of coded bits available for transmission of the TB. In some aspects, G may be the total number of coded bits available for transmission of the transport block not accounting for the tones used for the UCI multiplexing. The parameter C'=C if CBGTI is not present in the DCI scheduling the TB (e.g., DCI 506) and is the number of scheduled code blocks of the transport block if CB GTI is present in the DCI scheduling the TB (e.g., DCI 506). The redundancy version number for the transmission (e.g., PUSCH 510) may be denoted by $rv_{id}$ and $rv_{id}=0$, 1, 2, or 3. In some wireless communication systems, the rate matching output bit sequence $e_k$, k=0, 1, 2, ..., E−1, may be generated as follows:

```
k = 0;
j = 0;
while k < E
    if d_{(k_0+j)modN_{cb}} ≠ <NULL>
        e_k = d_{(k_0+j)modN_{cb}};
        k = k + 1;
    end if
    j = j + 1;
end while
```

The value of $k_0$ may be based on the redundancy version number and the LDPC base graph.

In some aspects, the rate matching output bit sequence $e_k$, k=0, 1, 2, ..., E−1, may be generated as follows:

```
k = 0;
j = 0;
while k < E
    if end of TBoMS slot
        k_0 = k_0 + N_{re_curr_slot} · N_L · Q_m
        j = 0
    if d_{(k_0+j)modN_{cb}} ≠ <NULL>
        e_k = d_{(k_0+j)modN_{cb}};
        k = k + 1;
    end if
    j = j + 1;
end while
```

The parameter $N_{re\_curr\_slot}$ may be the number of available tones for a PUSCH without accounting for tones used for UCI multiplexing.

In some wireless communication systems, the bit sequence $e_0, e_1, e_2, \ldots, e_{E-1}$ may be interleaved with (or interleaved to) bit sequence $f_0, f_1, f_2, \ldots, f_{E-1}$, according to the following:

---
for j = 0 to E/$Q_m$ −1
  for i = 0 to $Q_m$ −1
    $f_{i+j \cdot Q_m} = e_{i \cdot E/Q_m + j}$;
  end for
end for

---

If the value of E changes, the bit interleaving may change by a large degree. In some aspects provided herein, before the start of TBoMS, the UE 502 may be configured with rate matching that does not account for the UCI multiplexing. When there is dynamic UCI multiplexing, the rate matching output size may not be changed. If a reduced number of PUSCH bits are consumed (e.g., used for encoding) because of UCI multiplexing, the UE may skip (or erasure) the unused bits (e.g., while performing rate matching).

Figure 6:
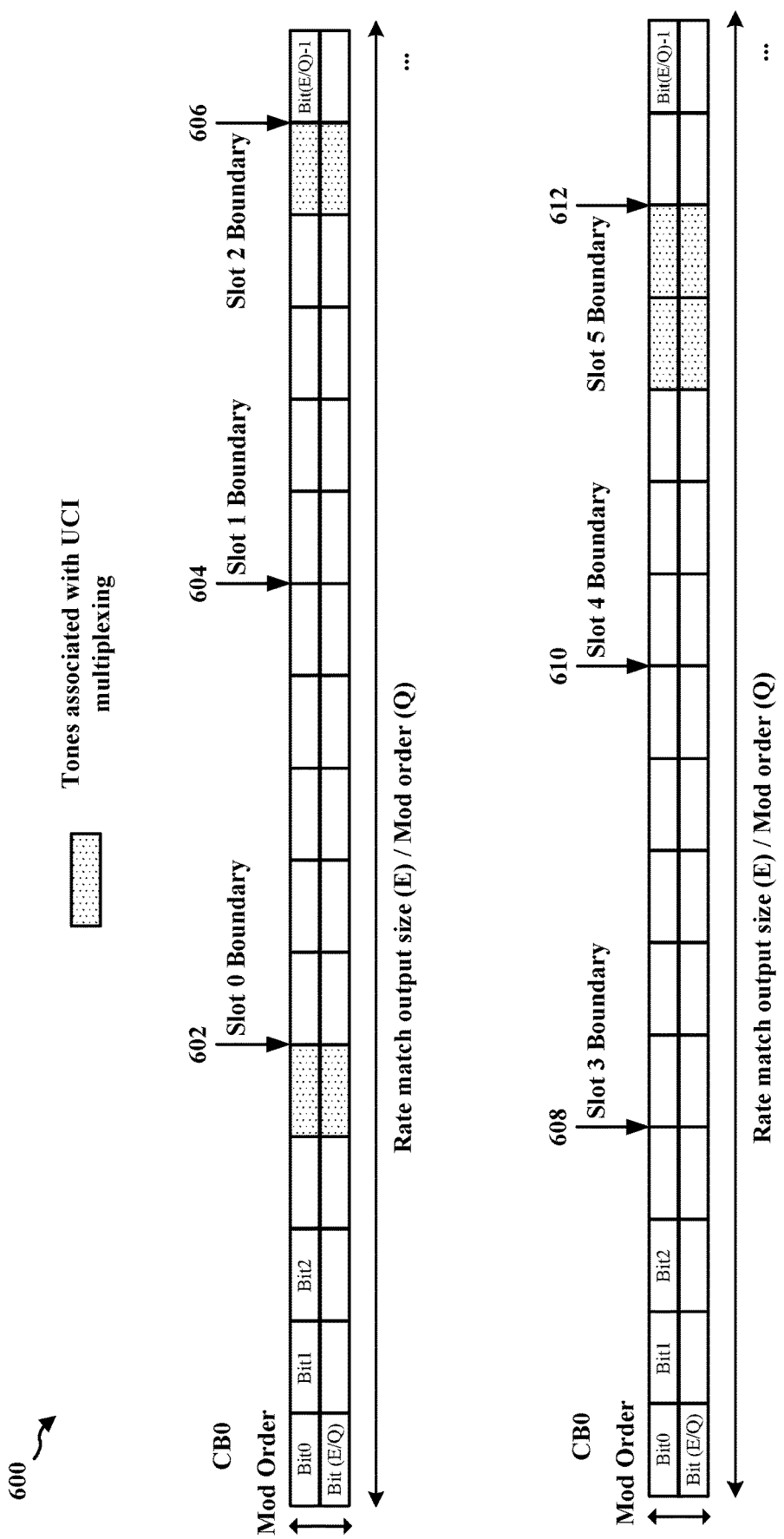
FIG. 6 is a diagram illustrating example rate matching.

In some aspects, the UE 502 may be configured to calculate the rate matching output size for each slot without accounting for UCI multiplexing (UCI known before the start of TBoMS or UCI unknown before the start of TBoMS). The UE 502 may memorize (e.g., store in a memory) a starting point (e.g., a slot boundary or otherwise referred to as a slot starting boundary) of a rate matching output bit consumption from a previous calculation. If some slots consume a reduced number of PUSCH bits due to UCI multiplexing, the UE 502 may skip (erasure) unused PUSCH bits. By skipping unused PUSCH bits, the UE may perform rate matching for TBoMS while supporting dynamic update of UCI multiplexing. The next slot may start from a pre-determined (e.g., determined before the rate matching output size is calculated) location (e.g., the boundary). FIG. 6 is a diagram 600 illustrating example rate matching. A TB size determination, a CB segmentation, and a rate matching size determination may be performed without considering UCI multiplexing. TB size determination may be based on a number of available subcarriers times number of symbols within a slot minus number of REs that are not available. As illustrated in FIG. 6, the UE 502 may first determine one or more slot boundaries (which may be otherwise referred to as slot starting boundary) 602, 604, 606, 608, 610, and 612 (e.g., such as based on the DCI 506). Then the UE 502 may proceed with encoding the PUSCH bits in the slots. When there is UCI multiplexing in a slot, a reduced number of bits may be consumed (e.g., allocated) for encoding the PUSCH because some of the bits may be used for the UCI multiplexing of the PUCCH. For example, the UE 502 may refrain from allocating the bits used for UCI multiplexing of the PUCCH for encoding the PUSCH. The UE 502 may skip those bits associated with UCI multiplexing and start encoding at a next boundary (which is determined prior to starting of the encoding). For example, the tone before the slot 0 boundary 602, the tone before the slot 2 boundary 606, and the two tones before the slot 5 boundary 612 may be skipped due to UCI multiplexing. In some aspects, the UE 502 may skip/erasure the tones by writing the PUSCH data in the tones and then overwriting the PUSCH data with UCI multiplexing data (such as a PUCCH A/N) on top of the PUSCH data (e.g., because the UE may not be aware of the UCI multiplexing data before writing the PUSCH data). In some aspects, the UE 502 may pre-calculate (e.g., calculate the boundaries before the encoding) the boundaries and the UE 502 may skip/erasure the tones by not using the tones for PUSCH data and start (e.g., resume) writing a PUSCH after the next boundary.

Figure 7:
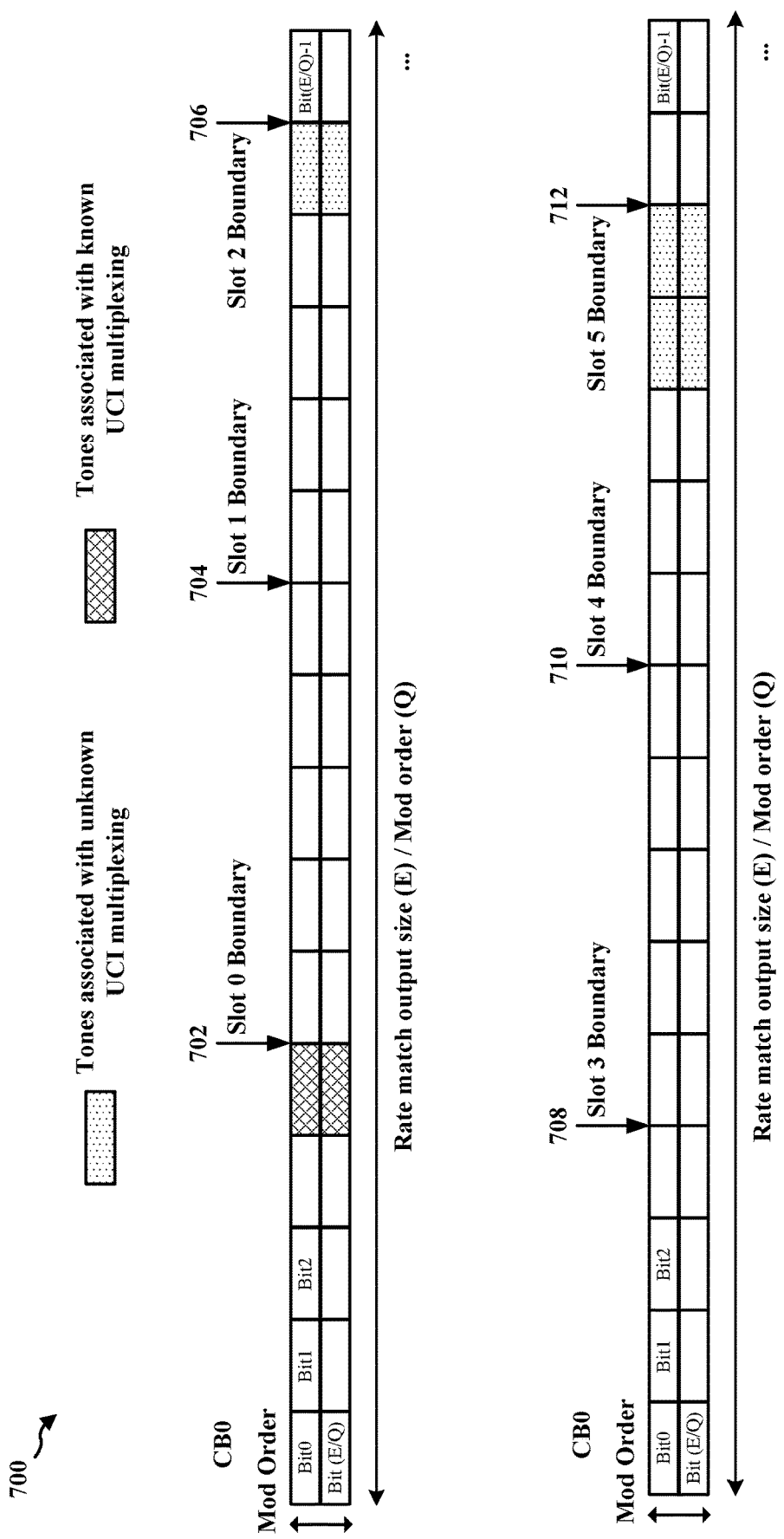
FIG. 7 is a diagram illustrating example rate matching.

In some aspects, the UE 502 may be configured to calculate the rate matching output size for each slot without accounting for unknown UCI multiplexing (UCI unknown before the start of TBoMS). The UE 502 may reflect the UCI known before the start of TBoMS in the rate matching output size (e.g., by marking REs associated with the UCI as unavailable for the PUSCH). The UE 502 may memorize (e.g., store in a memory) a starting point (e.g., a slot boundary or otherwise referred to as a slot starting boundary) of a rate matching output bit consumption from a previous calculation. If some slots consume a reduced number of PUSCH bits due to UCI multiplexing, the UE 502 may skip (erasure) unused PUSCH bits. A next slot may start from a pre-determined (e.g., determined before the rate matching output size is calculated) location (e.g., the boundary). FIG. 7 is a diagram 700 illustrating example rate matching. A TB size determination, a CB segmentation, and a rate matching size determination may be performed without considering unknown UCI multiplexing. As illustrated in FIG. 7, the UE 502 may first determine one or more slot boundaries (which may be otherwise referred to as slot starting boundary) 702, 704, 706, 708, 710, and 712. The UE 502 may know before the TBoMS start that the tone before the boundary 702 is used for UCI multiplexing (e.g., by having UCI multiplexing data available before the TBoMS start). A rate matching output size determined by the UE 502 may reflect the known UCI multiplexing before the boundary 702 (e.g., by marking REs associated with the UCI as unavailable). The UE 502 may proceed with encoding the PUSCH bits in the slots and mark REs associated with the UCI as unavailable and refrain from allocating PUSCH bits in REs associated with the UCI. When there is UCI multiplexing in a slot, a reduced number of bits may be consumed (e.g., used for PUSCH encoding). The UE 502 may skip those bits associated with UCI multiplexing and start encoding at a next boundary (which is determined prior to starting of the encoding). For example, a tone before the slot 2 boundary 706 and the two tones before the slot 5 boundary 712 may be skipped due to UCI multiplexing. Because the tone before the slot 0 boundary is known to be used by UCI multiplexing to the UE 502, the UE 502 may determine a rate matching output size (which may correspond to a slot length) based on the known UCI multiplexing and the PUSCH bits may not be skipped for the tone before the slot 0 boundary. In some aspects, the UE 502 may skip/erasure the tones by writing the PUSCH data in the tones and then overwriting the PUSCH data with UCI multiplexing data (such as PUCCH A/N) on top of the PUSCH data (e.g., because the UE may not be aware of the UCI multiplexing data before writing the PUSCH data). In some aspects, the UE 502 may pre-calculate (e.g., calculate the boundaries before the encoding) the boundaries and the UE 502 may skip/erasure the tones by not using the tones for PUSCH data and start (e.g., resume) writing a PUSCH after the next boundary.

In some aspects, the UE 502 may be configured to calculate the rate matching output size for each slot without accounting for UCI multiplexing (UCI known before the start of TBoMS or UCI unknown before the start of TBoMS). In some aspects, the UE 502 may not memorize (e.g., store in a memory) a starting point (e.g., a slot boundary or otherwise referred to as a slot starting boundary) of a rate matching output bit consumption from a previous calculation. If some slots consume a reduced number of PUSCH bits due to UCI multiplexing, the UE 502 stop at the end of used bits. In the next slot, a PUSCH transmission may resume after it was stopped in the last slot. In such aspects, the erasure is accumulated at the last PUSCH bits of a rate matched output in the entire timeframe for the TBoMS. In some aspects, the UE 502 may be configured to calculate the rate matching output size for each slot without accounting for unknown UCI multiplexing (UCI unknown before the start of TBoMS). The UE 502 may reflect UCI known before the start of TBoMS in the rate matching output size (e.g., by marking REs associated with the UCI as unavailable).

Figure 8:
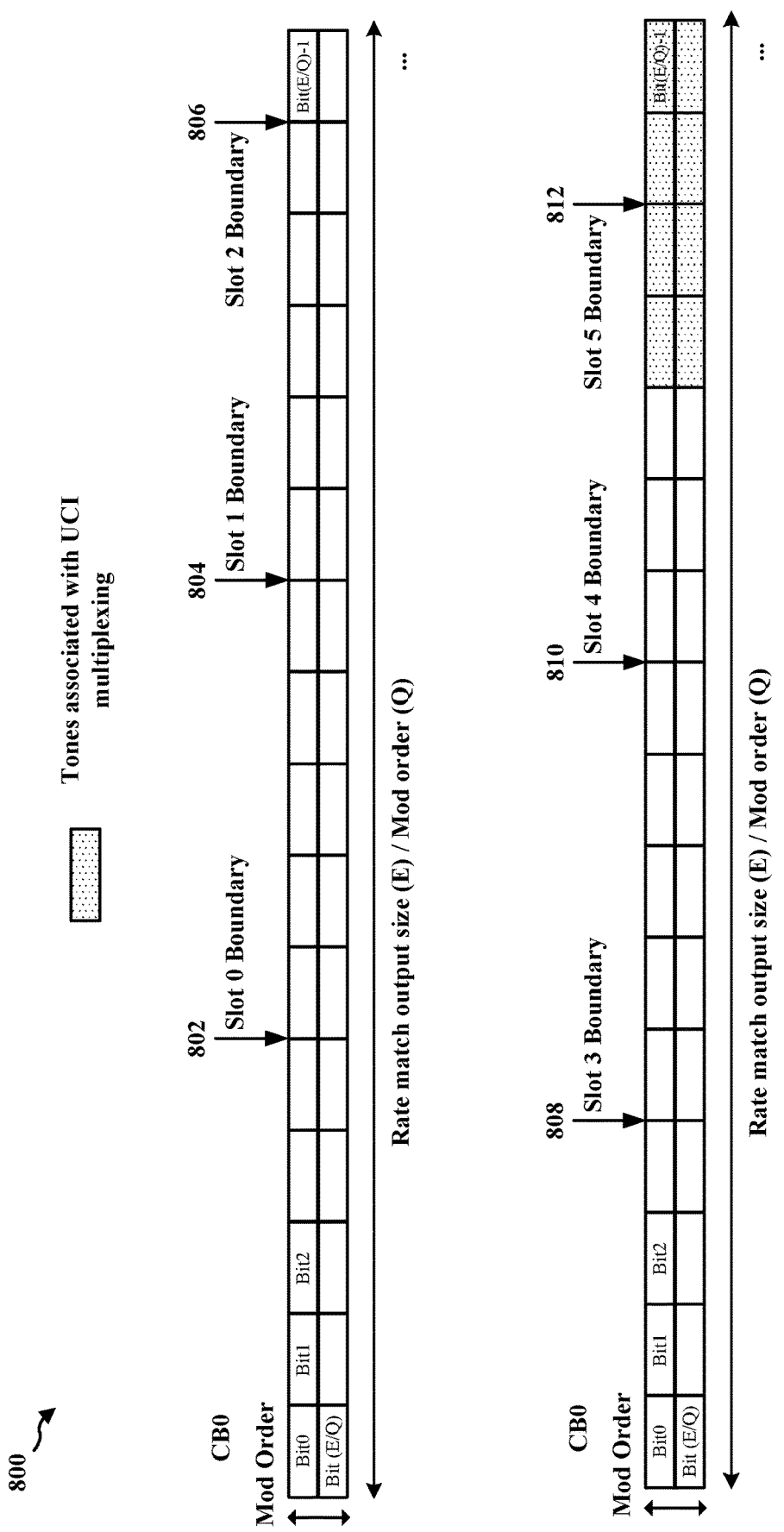
FIG. 8 is a diagram illustrating example rate matching.

FIG. 8 is a diagram 800 illustrating example rate matching. A TB size determination, a CB segmentation, and a rate matching size determination may be performed without considering unknown or known UCI multiplexing. In some aspects, the UE 502 may pre-calculate (e.g., calculate before having data to transmit) or calculate a rate matching output buffer start point for each slot. As illustrated in FIG. 8, there may be one or more slot boundaries (which may be otherwise referred to as slot starting boundary) 802, 804, 806, 808, 810, and 812. When there is UCI multiplexing in a slot, a reduced number of bits may be consumed. The UE 502 continue to encode and concentrate all the erasure/skipping at the end of the TB. For example, the tones skipped by the UE 502 may be at the end of the TB. In some aspects, the UE 502 may skip/erasure the tones by writing the PUSCH data in the tones and then overwriting the PUSCH data with UCI multiplexing data (such as a PUCCH A/N) on top of the PUSCH data (e.g., because the UE may not be aware of the UCI multiplexing data before writing the PUSCH data). In some aspects, the UE 502 may pre-calculate the boundaries (e.g., calculate the boundaries before the encoding) and the UE 502 may skip/erasure the tones by not using the tones for PUSCH data and start (e.g., resume) writing a PUSCH after the next boundary.

Figure 9:
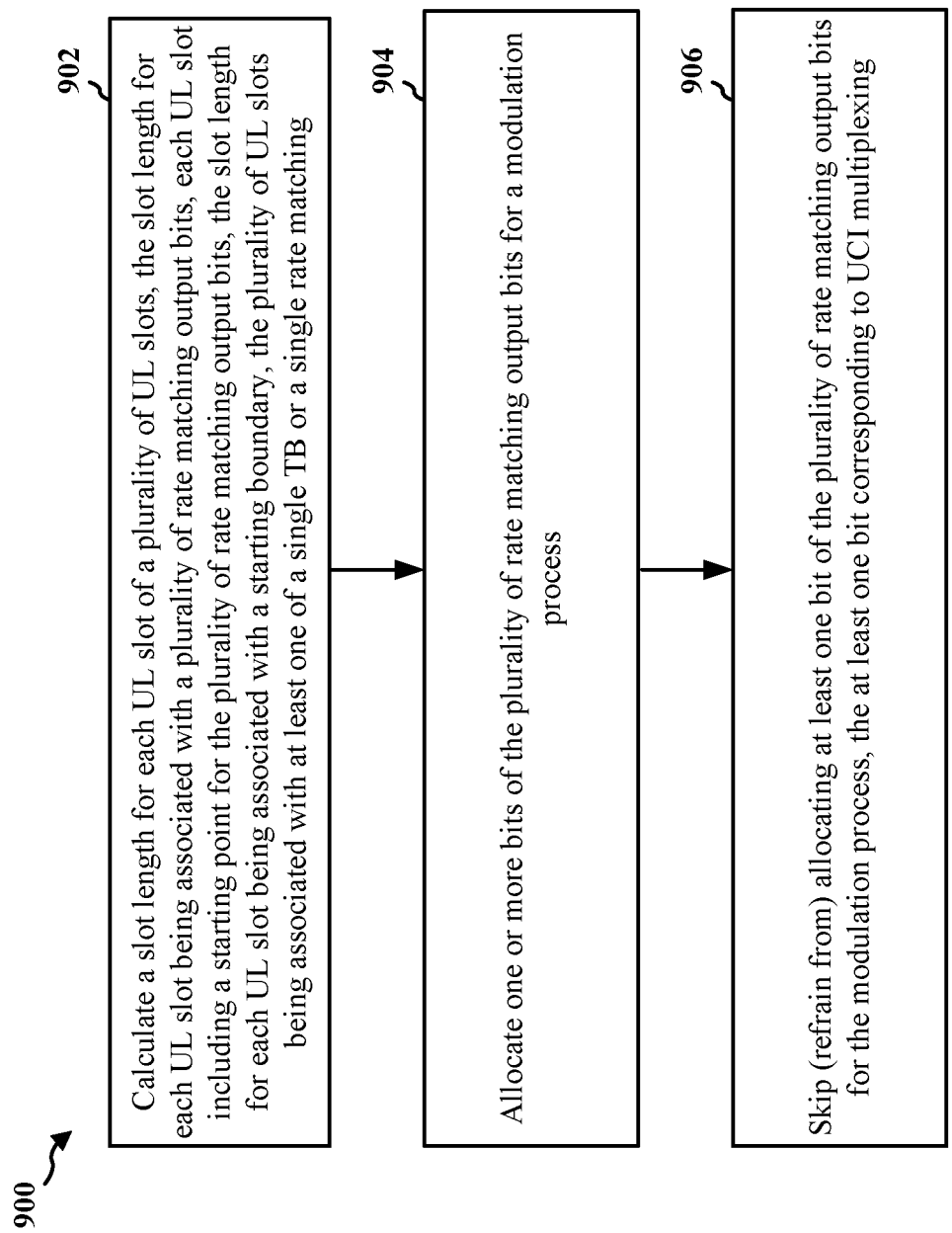
FIG. 9 is a flowchart of a method of wireless communication.

FIG. 9 is a flowchart 900 of a method of wireless communication. The method may be performed by a UE (e.g., the UE 104, the UE 502; the apparatus 1102).

At 902, the UE may calculate a slot length for each UL slot of a plurality of UL slots. The slot length for each UL slot may be associated with a plurality of rate matching output bits. Each UL slot may include a starting point for the plurality of rate matching output bits. The slot length for each UL slot may be associated with a starting boundary. The plurality of UL slots may be associated with at least one of a single TB or a single rate matching. For example, the UE 502 may calculate a slot length for each UL slot of a plurality of UL slots, as described in connection with FIG. 5. In some aspects, 902 may be performed by calculate component 1142 in FIG. 11.

At 904, the UE may allocate one or more bits of the plurality of rate matching output bits for a modulation process. For example, the UE 502 may allocate one or more bits of the plurality of rate matching output bits for a modulation process, as described in connection with FIG. 5. In some aspects, 904 may be performed by allocate component 1144 in FIG. 11.

At 906, the UE may skip (e.g., refrain from) allocating at least one bit of the plurality of rate matching output bits for the modulation process, the at least one bit corresponding to UCI multiplexing. For example, the UE 502 may skip (e.g., refrain from) allocating at least one bit of the plurality of rate matching output bits for the modulation process, the at least one bit corresponding to UCI multiplexing, as described in connection with FIG. 5. In some aspects, 906 may be performed by allocate component 1144 in FIG. 11.

Figure 10:
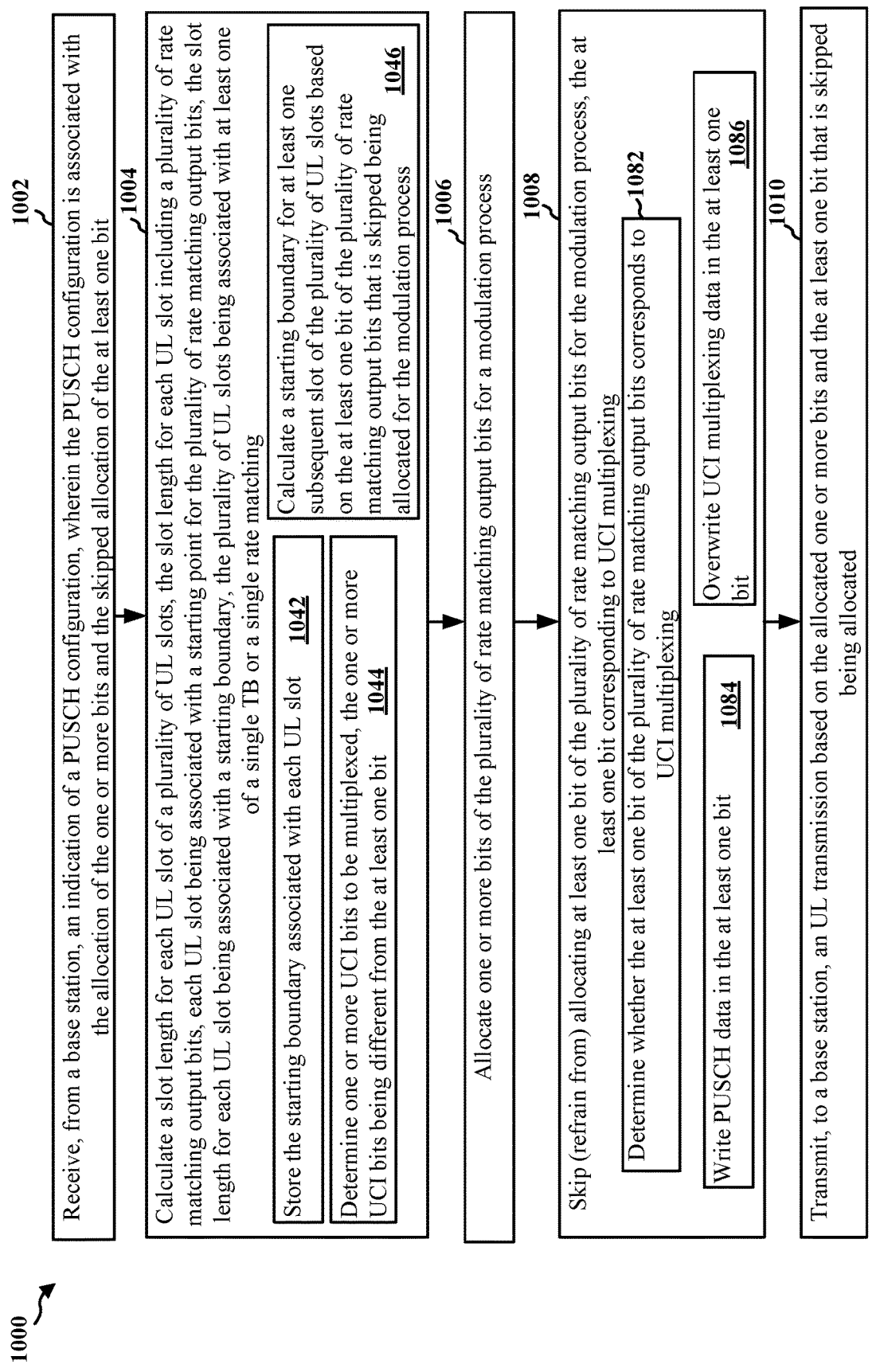
FIG. 10 is a flowchart of a method of wireless communication.

FIG. 10 is a flowchart 1000 of a method of wireless communication. The method may be performed by a UE (e.g., the UE 104, the UE 502; the apparatus 1102).

At 1002, the UE may receive, from a base station, an indication of a PUSCH configuration. The PUSCH configuration may be associated with the allocation of the one or more bits and the skipped allocation of the at least one bit. For example, the UE 502 may receive, from a base station 504, an indication of a PUSCH configuration (in DCI 506). In some aspects, 1002 may be performed by communicate component 1146 in FIG. 11. The base station may be a network entity such as a network node.

At 1004, the UE may calculate a slot length for each UL slot of a plurality of UL slots. The slot length for each UL slot may be associated with a plurality of rate matching output bits. Each UL slot may include a starting point for the plurality of rate matching output bits. The slot length for each UL slot may be associated with a starting boundary. The plurality of UL slots may be associated with at least one of a single TB or a single rate matching. For example, the UE 502 may calculate a slot length for each UL slot of a plurality of UL slots, as described in connection with FIG. 5. In some aspects, 1004 may be performed by calculate component 1142 in FIG. 11. In some aspects, the single TB corresponds to a TBoMS.

In some aspects, as part of 1004, at 1042, the UE may store the starting boundary associated with each UL slot, e.g., as described in connection with the boundaries 602-612 in FIG. 6 and the boundaries 702-712 in FIG. 7. In some aspects, the at least one bit of the plurality of rate matching output bits that is skipped being allocated may correspond to an end of one or more slots of the plurality of UL slots (such as end of slot 0/2/5 in FIGS. 6 and 7).

In some aspects, as part of 1004, at 1044, the UE may determine one or more UCI bits to be multiplexed, the one or more UCI bits may not correspond with the UCI multiplexing in 1008. For example, the UE 502 may determine one or more known UCI bits at the end of slot 0 in FIG. 7 and the UCI multiplexing used in 1008 may be based on unknown UCI multiplexing. In some aspects, the UE may calculate and store the starting boundary associated with each UL slot based on the one or more UCI bits (e.g., by avoid using REs associated with the one or more UCI bits). In some aspects, the at least one bit of the plurality of rate matching output bits that is skipped being allocated may correspond to an end of one or more slots of the plurality of UL slots (such as end of slot 2/5 in FIG. 7). In some aspects, the slot length may be calculated without storing the starting boundary associated with each UL slot. In such aspects, the at least one bit of the plurality of rate matching output bits that is skipped being allocated may correspond to an end of the plurality of UL slots (such as end of slot the plurality of slots in FIG. 8). In some aspects, the slot length may be calculated without storing the starting boundary associated with each UL slot based on the one or more UCI bits and the at least one bit of the plurality of rate matching output bits that is skipped may be allocated corresponds to an end of the plurality of UL slots (such as end of slot the plurality of slots in FIG. 8). In some aspects, as part of 1004, at 1046, the UE may calculate a starting boundary for at least one subsequent slot of the plurality of UL slots based on the at least one bit of the plurality of rate matching output bits that is skipped being allocated for the modulation process. In some aspects, the starting boundary for the at least one subsequent slot may be calculated without accounting for UCI multiplexing (e.g., ignoring UCI multiplexing or UCI multiplexing being not known). In some aspects, the calculation of the starting boundary for the at least one subsequent slot may be pre-calculated or predetermined.

At 1006, the UE may allocate one or more bits of the plurality of rate matching output bits for a modulation process. For example, the UE 502 may allocate one or more bits of the plurality of rate matching output bits for a modulation process, as described in connection with FIG. 5. In some aspects, 1006 may be performed by allocate component 1144 in FIG. 11. In some aspects, the plurality of rate matching output bits may correspond to a rate matching output size. In some aspects, each of the one or more bits may be allocated for the modulation process in one or more REs.

At 1008, the UE may skip (e.g., refrain from) allocating at least one bit of the plurality of rate matching output bits for the modulation process, the at least one bit corresponding to UCI multiplexing. For example, the UE 502 may skip (e.g., refrain from) allocating at least one bit of the plurality of rate matching output bits for the modulation process, the at least one bit corresponding to UCI multiplexing, as described in connection with FIG. 5. In some aspects, 1008 may be performed by allocate component 1144 in FIG. 11. In some aspects, as part of 1008, at 1082, the UE may determine whether the at least one bit of the plurality of rate matching output bits corresponds to UCI multiplexing. In some aspects, the at least one bit of the plurality of rate matching output bits that is skipped being allocated for the modulation process may correspond to at least one unused PUSCH bit. In some aspects, the UCI multiplexing may be associated one or more PUCCH acknowledgment or non-acknowledgment bits. In some aspects, as part of 1008, at 1084, the UE may write PUSCH data in the at least one bit. In some aspects, as part of 1008, at 1086, the UE may overwrite UCI multiplexing data in the at least one bit.

At 1010, the UE may transmit, to a base station, an UL transmission based on the allocated one or more bits and the at least one bit that is skipped being allocated. For example, the UE 502 may transmit, to a base station 504, an UL transmission (PUSCH 510) based on the allocated one or more bits and the at least one bit that is skipped being allocated, as described in connection with FIG. 5. In some aspects, 1010 may be performed by the communicate component 1146 in FIG. 11. The base station may be a network entity such as a network node.

Figure 11:
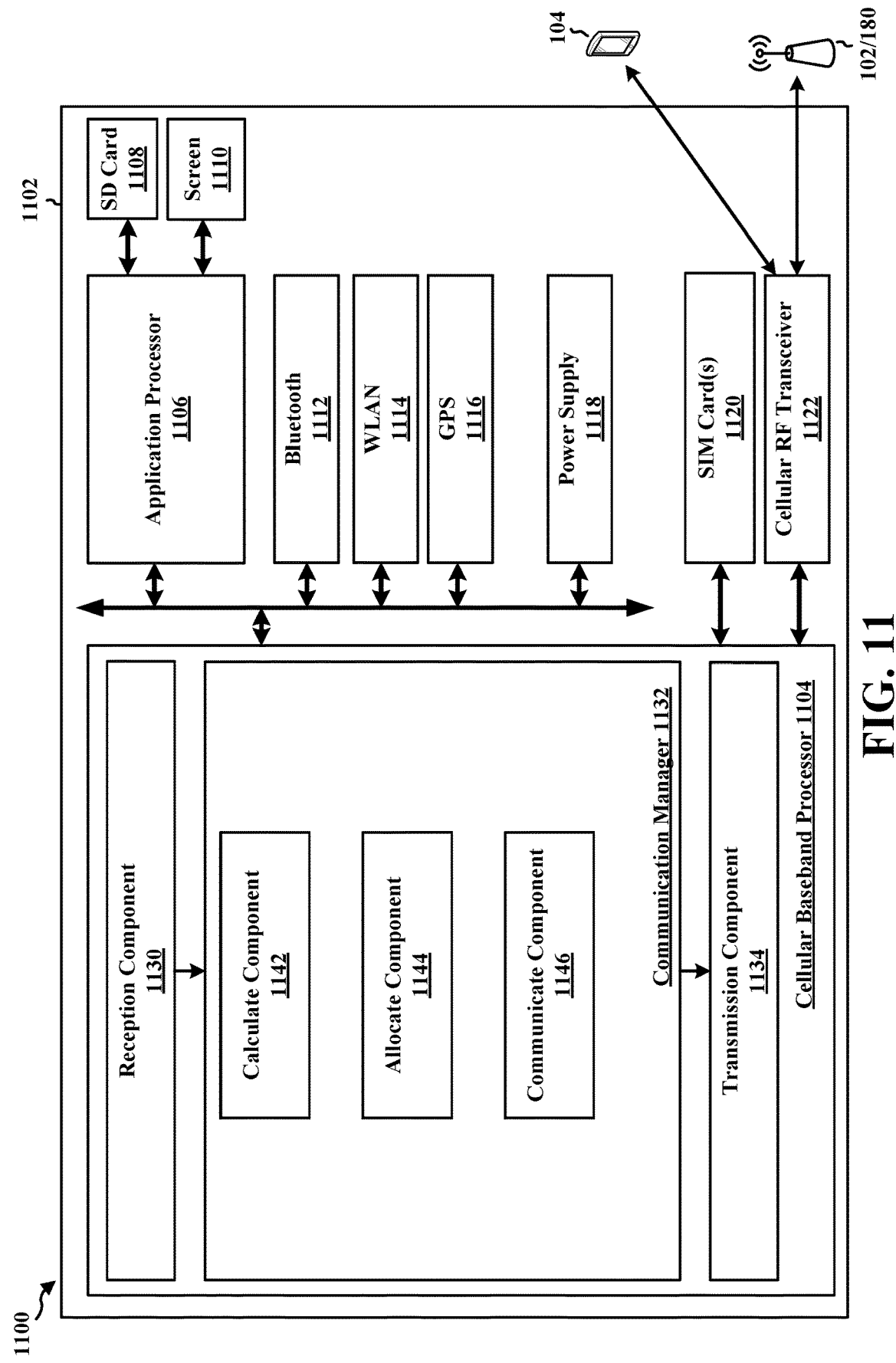
FIG. 11 is a diagram illustrating an example of a hardware implementation for an example apparatus.

FIG. 11 is a diagram 1100 illustrating an example of a hardware implementation for an apparatus 1102. The apparatus 1102 may be a UE, a component of a UE, or may implement UE functionality. In some aspects, the apparatus 1102 may include a cellular baseband processor 1104 (also referred to as a modem) coupled to a cellular RF transceiver 1122. In some aspects, the apparatus 1102 may further include one or more subscriber identity modules (SIM) cards 1120, an application processor 1106 coupled to a secure digital (SD) card 1108 and a screen 1110, a Bluetooth module 1112, a wireless local area network (WLAN) module 1114, a Global Positioning System (GPS) module 1116, or a power supply 1118. The cellular baseband processor 1104 communicates through the cellular RF transceiver 1122 with the UE 104 and/or BS 102/180. The cellular baseband processor 1104 may include a computer-readable medium/memory. The computer-readable medium/memory may be non-transitory. The cellular baseband processor 1104 is responsible for general processing, including the execution of software stored on the computer-readable medium/memory. The software, when executed by the cellular baseband processor 1104, causes the cellular baseband processor 1104 to perform the various functions described supra. The computer-readable medium/memory may also be used for storing data that is manipulated by the cellular baseband processor 1104 when executing software. The cellular baseband processor 1104 further includes a reception component 1130, a communication manager 1132, and a transmission component 1134. The communication manager 1132 includes the one or more illustrated components. The components within the communication manager 1132 may be stored in the computer-readable medium/memory and/or configured as hardware within the cellular baseband processor 1104. The cellular baseband processor 1104 may be a component of the UE 350 and may include the memory 360 and/or at least one of the TX processor 368, the RX processor 356, and the controller/processor 359. In one configuration, the apparatus 1102 may be a modem chip and include just the baseband processor 1104, and in another configuration, the apparatus 1102 may be the entire UE (e.g., see 350 of FIG. 3) and include the additional modules of the apparatus 1102.

The communication manager 1132 may include a calculate component 1142 that is configured to calculate a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching, e.g., as described in connection with 902 in FIGS. 9 and 1004 in FIG. 10. The communication manager 1132 may further include an allocate component 1144 that may be configured to allocate one or more bits of the plurality of rate matching output bits for a modulation process and skip (e.g., refrain from) allocating at least one bit of the plurality of rate matching output bits for the modulation process, the at least one bit corresponding to UCI multiplexing, e.g., as described in connection with 904 and 906 in FIGS. 9 and 1006 and 1008 in FIG. 10. The communication manager 1132 may further include a communicate component 1146 that may be configured to receive, from a base station, an indication of a PUSCH configuration and transmit, to a base station, an UL transmission based on the allocated one or more bits and the at least one bit that is skipped being allocated, e.g., as described in connection with 1002 and 1010 in FIG. 10. The base station may be a network entity such as a network node.

The apparatus may include additional components that perform each of the blocks of the algorithm in the flowcharts of FIGS. 9 and 10. As such, each block in the flowcharts of FIGS. 9 and 10 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1102 may include a variety of components configured for various functions. In one configuration, the apparatus 1102, and in particular the cellular baseband processor 1104, may include means for calculating a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching. The cellular baseband processor 1104 may further include means for allocating one or more bits of the plurality of rate matching output bits for a modulation process. The cellular baseband processor 1104 may further include means for skipping (e.g., refraining from) allocating at least one bit of the plurality of rate matching output bits for the modulation process, the at least one bit corresponding to UCI multiplexing. The cellular baseband processor 1104 may further include means for storing the starting boundary associated with each UL slot. The cellular baseband processor 1104 may further include means for determining one or more UCI bits to be multiplexed, the one or more UCI bits not corresponding with the UCI multiplexing. The cellular baseband processor 1104 may further include means for calculating and storing the starting boundary associated with each UL slot based on the one or more UCI bits. The cellular baseband processor 1104 may further include means for determining one or more UCI bits to be multiplexed, the one or more UCI bits not corresponding with the UCI multiplexing. The cellular baseband processor 1104 may further include means for receiving, from a base station, an indication of a PUSCH configuration, where the PUSCH configuration is associated with the allocation of the one or more bits and the skipped allocation of the at least one bit. The cellular baseband processor 1104 may further include means for determining whether the at least one bit of the plurality of rate matching output bits corresponds to UCI multiplexing. The cellular baseband processor 1104 may further include means for calculating a starting boundary for at least one subsequent slot of the plurality of UL slots based on the at least one bit of the plurality of rate matching output bits that is skipped being allocated for the modulation process. The cellular baseband processor 1104 may further include means for writing PUSCH data in the at least one bit. The cellular baseband processor 1104 may further include means for overwriting UCI multiplexing data in the at least one bit. The cellular baseband processor 1104 may further include means for transmitting, to a base station, an UL transmission based on the allocated one or more bits and the at least one bit that is skipped being allocated. The means may be one or more of the components of the apparatus 1102 configured to perform the functions recited by the means. As described supra, the apparatus 1102 may include the TX Processor 368, the RX Processor 356, and the controller/processor 359. As such, in one configuration, the means may be the TX Processor 368, the RX Processor 356, and the controller/processor 359 configured to perform the functions recited by the means.

Figure 12:
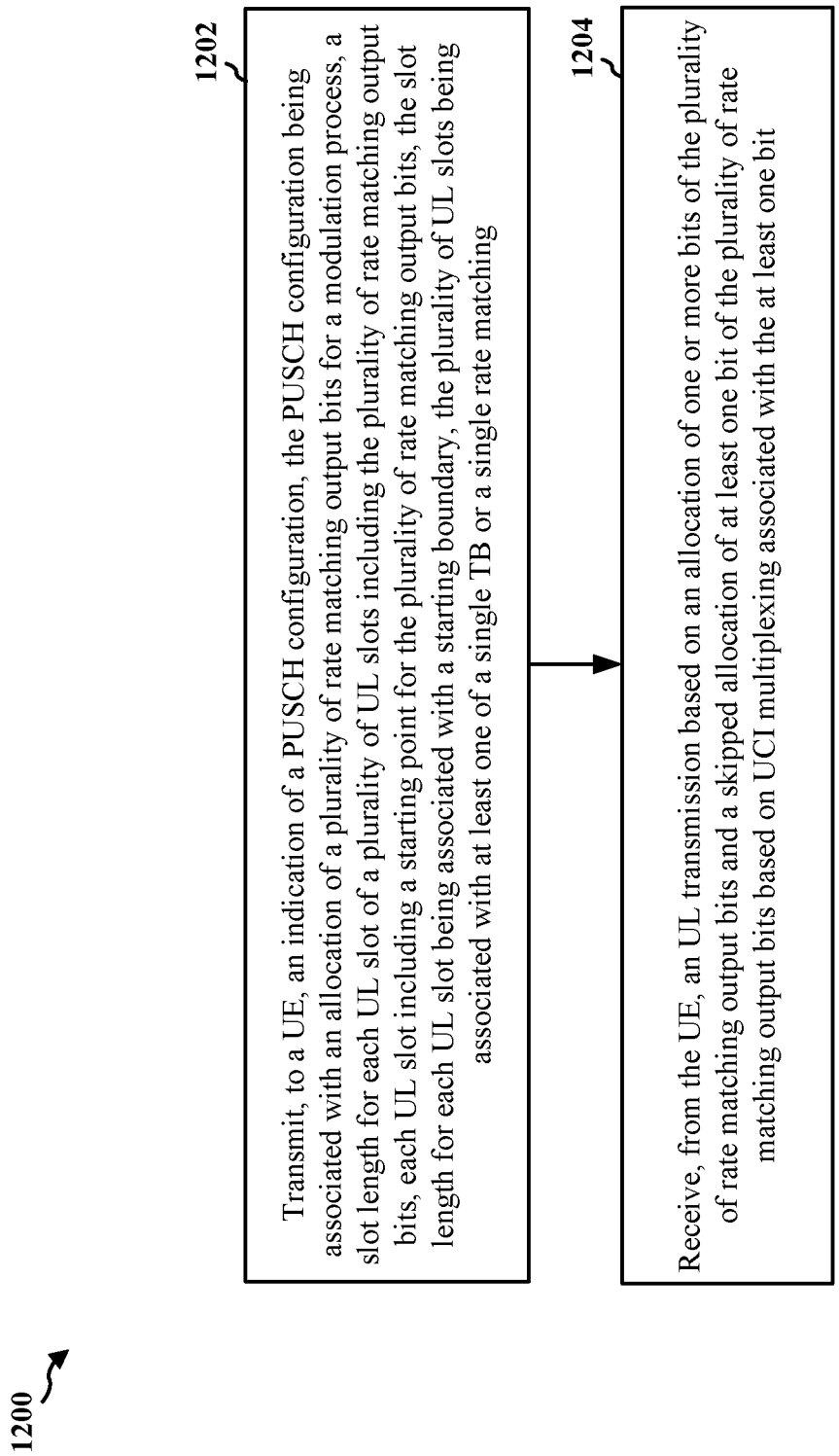
FIG. 12 is a flowchart of a method of wireless communication.

FIG. 12 is a flowchart 1200 of a method of wireless communication. The method may be performed by a base station (e.g., the base station 102/180, the base station 504; the apparatus 1302) In some aspects, the base station may be a network entity such as a network node.

At 1202, the base station may transmit, to a UE, an indication of a PUSCH configuration. The PUSCH configuration may be associated with an allocation of a plurality of rate matching output bits for a modulation process, a slot length for each UL slot of a plurality of UL slots being associated with the plurality of rate matching output bits. Each UL slot may include a starting point for the plurality of rate matching output bits. The slot length for each UL slot may be associated with a starting boundary, the plurality of UL slots may be associated with at least one of a single TB or a single rate matching. For example, the base station 504 may transmit, to a UE 502, an indication of a PUSCH configuration (such as DCI 506), as described in connection with FIG. 5. In some aspects, 1202 may be performed by indication component 1342 in FIG. 13. In some aspects, the plurality of rate matching output bits may correspond to a rate matching output size. In some aspects, the single TB may correspond to a TBoMS.

At 1204, the base station may receive, from the UE, an UL transmission based on an allocation of one or more bits of the plurality of rate matching output bits and a skipped allocation of at least one bit of the plurality of rate matching output bits based on UCI multiplexing associated with the at least one bit. For example, the base station 504 may receive, from the UE 502, an UL transmission (such as PUSCH 510) based on an allocation of one or more bits of the plurality of rate matching output bits and a skipped allocation of at least one bit of the plurality of rate matching output bits based on UCI multiplexing associated with the at least one bit, as described in connection with FIG. 5. In some aspects, 1204 may be performed by UL reception component 1344 in FIG. 13. In some aspects, each of the one or more bits may be allocated for the modulation process in one or more REs. In some aspects, the at least one bit that is skipped being allocated for the modulation process may correspond to at least one unused PUSCH bit. In some aspects, the UCI multiplexing may be associated one or more PUCCH acknowledgment or non-acknowledgment bits. In some aspects, the starting boundary for at least one subsequent slot of the plurality of UL slots may be calculated without accounting for UCI multiplexing and may be based on the at least one bit that is skipped being allocated for the modulation process.

Figure 13:
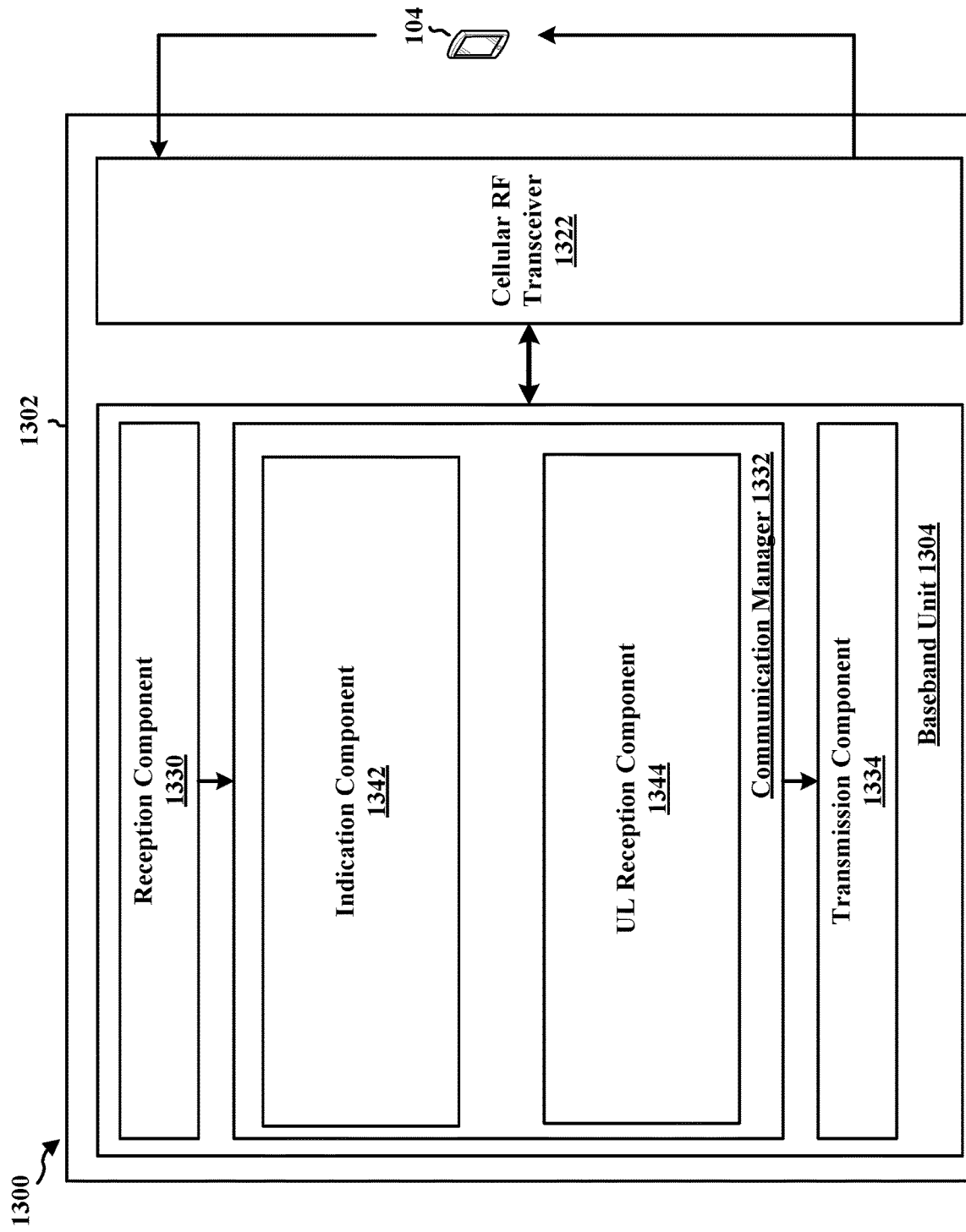
FIG. 13 is a diagram illustrating an example of a hardware implementation for an example apparatus.

FIG. 13 is a diagram 1300 illustrating an example of a hardware implementation for an apparatus 1302. The apparatus 1302 may be a base station, a component of a base station, or may implement base station functionality. In some aspects, the apparatus 1102 may include a baseband unit 1304. The baseband unit 1304 may communicate through a cellular RF transceiver 1322 with the UE 104. The baseband unit 1304 may include a computer-readable medium/memory. The baseband unit 1304 is responsible for general processing, including the execution of software stored on the computer-readable medium/memory. The software, when executed by the baseband unit 1304, causes the baseband unit 1304 to perform the various functions described supra. The computer-readable medium/memory may also be used for storing data that is manipulated by the baseband unit 1304 when executing software. The baseband unit 1304 further includes a reception component 1330, a communication manager 1332, and a transmission component 1334. The communication manager 1332 includes the one or more illustrated components. The components within the communication manager 1332 may be stored in the computer-readable medium/memory and/or configured as hardware within the baseband unit 1304. The baseband unit 1304 may be a component of the base station 310 and may include the memory 376 and/or at least one of the TX processor 316, the RX processor 370, and the controller/processor 375.

The communication manager 1332 may include an indication component 1342 that may transmit, to a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching, e.g., as described in connection with 1202 in FIG. 12. The communication manager 1332 further may include a UL reception component 1344 that may receive, from the UE, an UL transmission based on an allocation of one or more bits of the plurality of rate matching output bits and a skipped allocation of at least one bit of the plurality of rate matching output bits, the at least one bit associated with uplink control information (UCI) multiplexing, e.g., as described in connection with 1204 in FIG. 12.

The apparatus may include additional components that perform each of the blocks of the algorithm in the flowchart of FIG. 12. As such, each block in the flowcharts of FIG. 12 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1302 may include a variety of components configured for various functions. In one configuration, the apparatus 1302, and in particular the baseband unit 1304, may include means for transmitting, to a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching. The baseband unit 1304 may further include means for receiving, from the UE, an UL transmission based on an allocation of one or more bits of the plurality of rate matching output bits and a skipped allocation of at least one bit of the plurality of rate matching output bits, the at least one bit associated with uplink control information (UCI) multiplexing. The means may be one or more of the components of the apparatus 1302 configured to perform the functions recited by the means. As described supra, the apparatus 1302 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a UE, including: a memory; and at least one processor coupled to the memory, the memory storing instructions executable by the at least one processor to configure the apparatus to: calculate a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching; allocate one or more bits of the plurality of rate matching output bits for a modulation process; and refrain from allocating at least one bit of the plurality of rate matching output bits for the modulation process, the at least one bit corresponding to UCI multiplexing.

Aspect 2 is the apparatus of aspect 1, where the plurality of rate matching output bits corresponds to a rate matching output size.

Aspect 3 is the apparatus of any of aspects 1-2, where the single TB corresponds to a TBoMS.

Aspect 4 is the apparatus of any of aspects 1-3, where the instructions are further executable by the at least one processor to configure the UE to: store the starting boundary associated with each UL slot; where the at least one bit of the plurality of rate matching output bits that is refrained from being allocated corresponds to an end of one or more slots of the plurality of UL slots.

Aspect 5 is the apparatus of any of aspects 1-4, where the instructions are further executable by the at least one processor to configure the UE to: determine one or more UCI bits to be multiplexed, the one or more UCI bits not corresponding with the UCI multiplexing; and calculate and store the starting boundary associated with each UL slot based on the one or more UCI bits; where the at least one bit of the plurality of rate matching output bits that is refrained from being allocated corresponds to an end of one or more slots of the plurality of UL slots.

Aspect 6 is the apparatus of any of aspects 1-4, where the instructions are further executable by the at least one processor to configure the UE to: where the slot length is calculated without storing the starting boundary associated with each UL slot; and where the at least one bit of the plurality of rate matching output bits that is refrained from being allocated corresponds to an end of the plurality of UL slots.

Aspect 7 is the apparatus of any of aspects 1-4, where the instructions are further executable by the at least one processor to configure the UE to: determine one or more UCI bits to be multiplexed, the one or more UCI bits not corresponding with the UCI multiplexing; and where the slot length is calculated without storing the starting boundary associated with each UL slot based on the one or more UCI bits; and where the at least one bit of the plurality of rate matching output bits that is refrained from being allocated corresponds to an end of the plurality of UL slots.

Aspect 8 is the apparatus of any of aspects 1-7, where the instructions are further executable by the at least one processor to configure the UE to: receive, from a base station, an indication of a PUSCH configuration, and where the PUSCH configuration is associated with the allocation of the one or more bits and the refrained allocation of the at least one bit.

Aspect 9 is the apparatus of any of aspects 1-8, where each of the one or more bits is allocated for the modulation process in one or more REs.

Aspect 10 is the apparatus of any of aspects 1-9, where the instructions are further executable by the at least one processor to configure the UE to: determine whether the at least one bit of the plurality of rate matching output bits corresponds to UCI multiplexing.

Aspect 11 is the apparatus of any of aspects 1-10, where the at least one bit of the plurality of rate matching output bits that is refrained from being allocated for the modulation process corresponds to at least one unused PUSCH bit.

Aspect 12 is the apparatus of any of aspects 1-11, where the UCI multiplexing is associated one or more PUCCH acknowledgment or non-acknowledgment bits.

Aspect 13 is the apparatus of any of aspects 1-12, where the instructions are further executable by the at least one processor to configure the UE to: calculate a starting boundary for at least one subsequent slot of the plurality of UL slots based on the at least one bit of the plurality of rate matching output bits that is refrained from being allocated for the modulation process.

Aspect 14 is the apparatus of any of aspects 1-13, where the starting boundary for the at least one subsequent slot is calculated without accounting for UCI multiplexing.

Aspect 15 is the apparatus of any of aspects 1-14, where the calculation of the starting boundary for the at least one subsequent slot is pre-calculated or predetermined.

Aspect 16 is the apparatus of any of aspects 1-15, where the instructions are further executable by the at least one processor to configure the UE to refrain from allocating the at least one bit by: writing PUSCH data in the at least one bit; and overwriting UCI multiplexing data in the at least one bit.

Aspect 17 is the apparatus of any of aspects 1-16, where the instructions are further executable by the at least one processor to configure the UE to: transmit, to a base station, an UL transmission based on the allocated one or more bits and the at least one bit that is refrained from being allocated.

Aspect 18 is the apparatus of any of aspects 1-17, further including a transceiver or an antenna coupled to the at least one processor.

Aspect 19 is an apparatus for wireless communication at a network entity, including: a memory; and at least one processor coupled to the memory, the memory storing instructions executable by the at least one processor to configure the apparatus to: transmit, for a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching; and receive an UL transmission based on an allocation of one or more bits of the plurality of rate matching output bits and a refrained allocation of at least one bit of the plurality of rate matching output bits, the at least one bit associated with uplink control information (UCI) multiplexing.

Aspect 20 is the apparatus of aspect 19, where the plurality of rate matching output bits corresponds to a rate matching output size.

Aspect 21 is the apparatus of any of aspects 19-20, where the single TB corresponds to a TBoMS.

Aspect 22 is the apparatus of any of aspects 19-21, where each of the one or more bits is allocated for the modulation process in one or more REs.

Aspect 23 is the apparatus of any of aspects 19-22, where the at least one bit that is skipped being allocated for the modulation process corresponds to at least one unused PUSCH bit.

Aspect 24 is the apparatus of any of aspects 19-23, where the UCI multiplexing is associated one or more PUCCH acknowledgment or non-acknowledgment bits.

Aspect 25 is the apparatus of any of aspects 19-24, where the starting boundary for at least one subsequent slot of the plurality of UL slots is calculated without accounting for UCI multiplexing and based on the at least one bit that is skipped being allocated for the modulation process.

Aspect 26 is the apparatus of any of aspects 19-25, further including a transceiver coupled to the at least one processor.

Aspect 27 is a method of wireless communication at a UE, including: calculating a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching; allocating one or more bits of the plurality of rate matching output bits for a modulation process; and refraining allocating at least one bit of the plurality of rate matching output bits for the modulation process, the at least one bit corresponding to UCI multiplexing.

Aspect 28 is the method of aspect 27, further including a method for implementing any of aspects 2 to 18.

Aspect 29 is an apparatus for wireless communication at a UE, including: means for calculating a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching; means for allocating one or more bits of the plurality of rate matching output bits for a modulation process; and means for refraining from allocating at least one bit of the plurality of rate matching output bits for the modulation process, the at least one bit corresponding to UCI multiplexing.

Aspect 30 is the apparatus for wireless communication of aspect 29, further including means for implementing any of aspects 2 to 18.

Aspect 31 is a computer-readable medium storing computer executable code at a UE, the code when executed by a processor causes the processor to: calculate a slot length for each UL slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single TB or a single rate matching; allocate one or more bits of the plurality of rate matching output bits for a modulation process; and refrain from allocating at least one bit of the plurality of rate matching output bits for the modulation process, the at least one bit corresponding to UCI multiplexing.

Aspect 32 is the computer-readable medium of aspect 31, where the code when executed by the processor causes the processor to implement any of aspects 2 to 18.

Aspect 33 is a method of wireless communication at a base station, including: transmitting, for a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching; and receiving an UL transmission based on an allocation of one or more bits of the plurality of rate matching output bits and a skipped allocation of at least one bit of the plurality of rate matching output bits, the at least one bit associated with uplink control information (UCI) multiplexing.

Aspect 34 is the method of aspect 33, further including a method for implementing any of aspects 20 to 26.

Aspect 35 is an apparatus for wireless communication at a base station, including: means for transmitting, for a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching; and means for receiving an UL transmission based on an allocation of one or more bits of the plurality of rate matching output bits and a skipped allocation of at least one bit of the plurality of rate matching output bits, the at least one bit associated with uplink control information (UCI) multiplexing.

Aspect 36 is the apparatus for wireless communication of aspect 35, further including means for implementing any of aspects 20 to 26.

Aspect 37 is a computer-readable medium storing computer executable code at a base station, the code when executed by a processor causes the processor to: transmit, for a UE, an indication of a PUSCH configuration, the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single TB or a single rate matching; and receive an UL transmission based on an allocation of one or more bits of the plurality of rate matching output bits and a skipped allocation of at least one bit of the plurality of rate matching output bits, the at least one bit associated with uplink control information (UCI) multiplexing.

Aspect 38 is the computer-readable medium of aspect 37, where the code when executed by the processor causes the processor to implement any of aspects 20 to 26.

What is claimed is:

1. An apparatus for wireless communication at a user equipment (UE), comprising:
    a memory; and
    at least one processor coupled to the memory, the memory storing instructions executable by the at least one processor to configure the apparatus to:
       calculate a slot length for each uplink (UL) slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single transport block (TB) or a single rate matching;
       allocate one or more bits of the plurality of rate matching output bits for a modulation process; and
       refrain from allocating at least one bit of the plurality of rate matching output bits for the modulation process, the at least one bit corresponding to uplink control information (UCI) multiplexing.

2. The apparatus of claim 1, wherein the plurality of rate matching output bits corresponds to a rate matching output size.

3. The apparatus of claim 1, wherein the single TB corresponds to a TB over multiple slots (TBoMS).

4. The apparatus of claim 1, wherein the instructions are further executable by the at least one processor to configure the UE to:
    store the starting boundary associated with each UL slot;
    wherein the at least one bit of the plurality of rate matching output bits that is refrained from being allocated corresponds to an end of one or more slots of the plurality of UL slots.

5. The apparatus of claim 1, wherein the instructions are further executable by the at least one processor to configure the UE to:
 determine one or more UCI bits to be multiplexed, the one or more UCI bits not corresponding with the UCI multiplexing; and
 calculate and store the starting boundary associated with each UL slot based on the one or more UCI bits;
 wherein the at least one bit of the plurality of rate matching output bits that is refrained from being allocated corresponds to an end of one or more slots of the plurality of UL slots.

6. The apparatus of claim 1, wherein the instructions are further executable by the at least one processor to configure the UE to:
 wherein the slot length is calculated without storing the starting boundary associated with each UL slot;
 wherein the at least one bit of the plurality of rate matching output bits that is refrained from being allocated corresponds to an end of the plurality of UL slots.

7. The apparatus of claim 1, wherein the instructions are further executable by the at least one processor to configure the UE to:
 determine one or more UCI bits to be multiplexed, the one or more UCI bits not corresponding with the UCI multiplexing; and
 wherein the slot length is calculated without storing the starting boundary associated with each UL slot based on the one or more UCI bits;
 wherein the at least one bit of the plurality of rate matching output bits that is refrained from being allocated corresponds to an end of the plurality of UL slots.

8. The apparatus of claim 1, wherein the instructions are further executable by the at least one processor to configure the UE to:
 receive, from a base station, an indication of a physical uplink shared channel (PUSCH) configuration, wherein the PUSCH configuration is associated with the allocation of the one or more bits and the refrained allocation of the at least one bit.

9. The apparatus of claim 1, wherein each of the one or more bits is allocated for the modulation process in one or more resource elements (REs).

10. The apparatus of claim 1, wherein the instructions are further executable by the at least one processor to configure the UE to:
 determine whether the at least one bit of the plurality of rate matching output bits corresponds to UCI multiplexing.

11. The apparatus of claim 1, wherein the at least one bit of the plurality of rate matching output bits that is refrained from being allocated for the modulation process corresponds to at least one unused physical uplink shared channel (PUSCH) bit.

12. The apparatus of claim 11, wherein the UCI multiplexing is associated one or more physical uplink control channel (PUCCH) acknowledgment or non-acknowledgment bits.

13. The apparatus of claim 1, wherein the instructions are further executable by the at least one processor to configure the UE to:
 calculate a first starting boundary for at least one subsequent slot of the plurality of UL slots based on the at least one bit of the plurality of rate matching output bits that is refrained from being allocated for the modulation process.

14. The apparatus of claim 13, wherein the starting boundary for the at least one subsequent slot is calculated without accounting for UCI multiplexing.

15. The apparatus of claim 13, wherein the calculation of the starting boundary for the at least one subsequent slot is pre-calculated or predetermined.

16. The apparatus of claim 1, wherein the instructions are further executable by the at least one processor to configure the UE to refrain from allocating the at least one bit by:
 writing physical uplink shared channel (PUSCH) data in the at least one bit; and
 overwriting UCI multiplexing data in the at least one bit.

17. The apparatus of claim 1, wherein the instructions are further executable by the at least one processor to configure the UE to:
 transmit, to a base station, an UL transmission based on the allocated one or more bits and the at least one bit that is refrained from being allocated.

18. The apparatus of claim 1, further comprising a transceiver coupled to the at least one processor.

19. An apparatus for wireless communication at a network entity, comprising:
 a memory; and
 at least one processor coupled to the memory, the memory storing instructions executable by the at least one processor to configure the apparatus to:
  transmit an indication of a physical uplink shared channel (PUSCH) configuration for a user equipment (UE), the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single transport block (TB) or a single rate matching; and
  receive an UL transmission based on a first allocation of one or more bits of the plurality of rate matching output bits and a refrained allocation of at least one bit of the plurality of rate matching output bits, the at least one bit associated with uplink control information (UCI) multiplexing.

20. The apparatus of claim 19, wherein the plurality of rate matching output bits corresponds to a rate matching output size.

21. The apparatus of claim 19, wherein the single TB corresponds to a TB over multiple slots (TBoMS).

22. The apparatus of claim 19, wherein each of the one or more bits is allocated for the modulation process in one or more resource elements (REs).

23. The apparatus of claim 19, wherein the at least one bit that is skipped being allocated for the modulation process corresponds to at least one unused physical uplink shared channel (PUSCH) bit.

24. The apparatus of claim 23, wherein the UCI multiplexing is associated one or more physical uplink control channel (PUCCH) acknowledgment or non-acknowledgment bits.

25. The apparatus of claim 19, wherein the starting boundary for at least one subsequent slot of the plurality of UL slots is calculated without accounting for UCI multiplexing and based on the at least one bit that is skipped being allocated for the modulation process.

26. The apparatus of claim 19, further comprising an antenna or a transceiver coupled to the at least one processor.

27. A method of wireless communication at a user equipment (UE), comprising:
- calculating a slot length for each uplink (UL) slot of a plurality of UL slots, the slot length for each UL slot being associated with a plurality of rate matching output bits, each UL slot including a starting point for the plurality of rate matching output bits, the slot length for each UL slot being associated with a starting boundary, the plurality of UL slots being associated with at least one of a single transport block (TB) or a single rate matching;
- allocating one or more bits of the plurality of rate matching output bits for a modulation process; and
- refraining from allocating at least one bit of the plurality of rate matching output bits for the modulation process, the at least one bit corresponding to uplink control information (UCI) multiplexing.

28. The method of claim 27, further comprising:
- storing the starting boundary associated with each UL slot;
- wherein the at least one bit of the plurality of rate matching output bits that is refrained from being allocated corresponds to an end of one or more slots of the plurality of UL slots.

29. The method of claim 27, wherein the single TB corresponds to a TB over multiple slots (TBoMS).

30. A method for wireless communication at a network entity, comprising:
- transmitting an indication of a physical uplink shared channel (PUSCH) configuration for a user equipment (UE), the PUSCH configuration being associated with an allocation of a plurality of rate matching output bits for a modulation process, a slot length for each UL slot of a plurality of UL slots being associated with the plurality of rate matching output bits, each UL slot including a starting point for the plurality of rate matching output bits, the slot length for each UL slot being associated with a starting boundary, the plurality of UL slots being associated with at least one of a single transport block (TB) or a single rate matching; and
- receiving an UL transmission based on a first allocation of one or more bits of the plurality of rate matching output bits and a refrained allocation of at least one bit of the plurality of rate matching output bits, the at least one bit associated with uplink control information (UCI) multiplexing.

* * * * *